(12) United States Patent
Prakash et al.

(10) Patent No.: US 8,416,751 B2
(45) Date of Patent: *Apr. 9, 2013

(54) METHOD AND APPARATUS USED FOR AIRLINK COMMUNICATIONS

(75) Inventors: Rajat Prakash, San Diego, CA (US);
Fatih Ulupinar, San Diego, CA (US);
Gavin Horn, La Jolla, CA (US); Paul E. Bender, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 691 days.

This patent is subject to a terminal disclaimer.

(21) Appl. No.: 11/759,887

(22) Filed: Jun. 7, 2007

(65) Prior Publication Data
US 2007/0286151 A1 Dec. 13, 2007

Related U.S. Application Data

(60) Provisional application No. 60/812,011, filed on Jun. 7, 2006, provisional application No. 60/812,012, filed on Jun. 7, 2006.

(51) Int. Cl.
*H04J 3/24* (2006.01)
*H04W 4/00* (2009.01)
*H04L 12/56* (2006.01)

(52) U.S. Cl.
USPC ........... 370/338; 370/349; 370/389; 370/393; 370/401

(58) Field of Classification Search .................. 370/310, 370/328–329, 331, 338, 341, 348–350, 389, 370/392–393, 399, 395.5, 395.52, 395.54, 370/400–401, 472–476, 340, 390, 408, 901–902, 370/911–913, 395.3; 455/418, 434, 432.1–432.3, 455/455/435.1–435.2, 436–446, 466, 524–525, 455/554.1–554.2, 555, 556.2, 557, 560–561

See application file for complete search history.

(56) References Cited

U.S. PATENT DOCUMENTS 6,038,233 A 3/2000 Hamamoto et al.
6,115,394 A 9/2000 Balachandran et al.
(Continued)

FOREIGN PATENT DOCUMENTS

CA 2646082 A1 12/2007
CA 2648119 A1 12/2007
(Continued)

OTHER PUBLICATIONS

International Search Report—PCT/US07/070645, International Search Authority—European Patent Office—Dec. 3, 2007.
(Continued)

*Primary Examiner* — Meless Zewdu
(74) *Attorney, Agent, or Firm* — Darren M. Simon

(57) ABSTRACT

Methods and apparatus for communicating between an access terminal (AT) and a device serving the AT by way of an Access Point (AP) are described. In accordance with one feature serving devices may be assigned specific addresses which are interpreted based on the source of the communication, e.g., MAC packet, in which the address is used. Such addresses may be interpreted as being of a different type than other addresses which can be interpreted and/or used without taking into account the identity of the sender. In some embodiments Session Controllers and/or Internet Attachment Points (IAPs) are identified with such addresses. The address value is the same for one or more ATs but is interpreted at an AP receiving such the IAP address based on information corresponding to the AT which sent the packet including the IAP or Session Controller address.

72 Claims, 10 Drawing Sheets

U.S. PATENT DOCUMENTS

| | | | |
|---|---|---|---|
| 6,122,671 | A | 9/2000 | Farrar, Jr. et al. |
| 6,480,527 | B1 | 11/2002 | Kim et al. |
| 6,487,602 | B1 | 11/2002 | Thakker |
| 6,625,145 | B1* | 9/2003 | Winell .......... 370/389 |
| 6,697,354 | B1 | 2/2004 | Borella et al. |
| 6,717,956 | B1 | 4/2004 | Fan et al. |
| 6,738,366 | B1 | 5/2004 | Etemad et al. |
| 6,822,957 | B1 | 11/2004 | Schuster et al. |
| 7,016,328 | B2* | 3/2006 | Chari et al. .......... 370/331 |
| 7,170,871 | B2 | 1/2007 | Eyuboglu et al. |
| 7,221,651 | B2* | 5/2007 | Mizoguchi et al. .......... 370/241 |
| 7,385,957 | B2 | 6/2008 | Oneill |
| 7,453,852 | B2 | 11/2008 | Buddhikot et al. |
| 7,505,432 | B2* | 3/2009 | Leung et al. .......... 370/331 |
| 7,609,701 | B2 | 10/2009 | Yang et al. |
| 7,639,686 | B2 | 12/2009 | Wetterwald et al. |
| 7,715,413 | B2 | 5/2010 | Vaziri et al. |
| 7,944,947 | B2* | 5/2011 | Nykanen et al. .......... 370/475 |
| 8,098,662 | B2 | 1/2012 | Prakash et al. |
| 8,134,952 | B2 | 3/2012 | Prakash et al. |
| 8,259,702 | B2 | 9/2012 | Prakash et al. |
| 2002/0058480 | A1 | 5/2002 | Ikeda |
| 2002/0191567 | A1 | 12/2002 | Famolari et al. |
| 2003/0009561 | A1* | 1/2003 | Sollee .......... 709/227 |
| 2003/0161319 | A1* | 8/2003 | Okagawa et al. .......... 370/395.4 |
| 2004/0005894 | A1 | 1/2004 | Trossen et al. |
| 2004/0097232 | A1 | 5/2004 | Haverinen |
| 2004/0167988 | A1* | 8/2004 | Rune et al. .......... 709/238 |
| 2004/0213274 | A1* | 10/2004 | Ean et al. .......... 370/401 |
| 2004/0255331 | A1 | 12/2004 | Inoue et al. |
| 2005/0010686 | A1* | 1/2005 | Nishida et al. .......... 709/238 |
| 2005/0084079 | A1 | 4/2005 | Lang |
| 2005/0141515 | A1 | 6/2005 | Mangin et al. |
| 2005/0190818 | A1 | 9/2005 | Sunaga et al. |
| 2005/0259654 | A1* | 11/2005 | Faulk, Jr. .......... 370/392 |
| 2006/0029081 | A1* | 2/2006 | Yan et al. .......... 370/395.52 |
| 2006/0098644 | A1* | 5/2006 | Pullela et al. .......... 370/389 |
| 2006/0209759 | A1 | 9/2006 | Vesterinen |
| 2006/0234636 | A1* | 10/2006 | Miller et al. .......... 455/67.11 |
| 2006/0270437 | A1* | 11/2006 | Ueda et al. .......... 455/522 |
| 2007/0047583 | A1* | 3/2007 | Assa et al. .......... 370/471 |
| 2007/0189309 | A1* | 8/2007 | Bosch et al. .......... 370/401 |
| 2008/0267186 | A1 | 10/2008 | Boukis et al. |

FOREIGN PATENT DOCUMENTS

| | | |
|---|---|---|
| CA | 2648122 A1 | 12/2007 |
| CA | 2651551 A1 | 12/2007 |
| CN | 1437809 A | 8/2003 |
| EP | 0594196 A1 | 4/1994 |
| EP | 1445919 | 8/2004 |
| EP | 2027703 | 2/2009 |
| GB | 2415855 A | 1/2006 |
| JP | 2001244937 A | 9/2001 |
| JP | 2002534911 T | 10/2002 |
| JP | 2002534922 A | 10/2002 |
| JP | 2003526277 T | 9/2003 |
| JP | 2009514508 T | 4/2009 |
| JP | 2009514531 T | 4/2009 |
| JP | 2009514536 T | 4/2009 |
| JP | 2009540693 | 11/2009 |
| JP | 4847583 | 10/2011 |
| RU | 2073913 C1 | 2/1997 |
| WO | WO9205556 | 4/1992 |
| WO | WO9307691 | 4/1993 |
| WO | WO9912364 A2 | 3/1999 |
| WO | WO9945678 A1 | 9/1999 |
| WO | WO0041376 | 7/2000 |
| WO | WO0167676 A2 | 9/2001 |
| WO | WO03041341 A1 | 5/2003 |
| WO | 03081860 | 10/2003 |
| WO | WO2005101731 | 10/2005 |
| WO | WO2007143679 | 12/2007 |
| WO | WO2007143717 | 12/2007 |

OTHER PUBLICATIONS

R. Hinden and S. Deering, RFC 4291, IP Version 6 Addressing Architecture, Feb. 2006, the Internet Society, pp. 13-15.

Written Opinion—PCT/US2007/070645, International Search Authority, European Patent Office, Mar. 12, 2007.

Taiwanese Search report—096120627—TIPO—Sep. 3, 2010.

\* cited by examiner

METHOD AND APPARATUS USED FOR AIRLINK COMMUNICATIONS

RELATED APPLICATIONS

The present application claims the benefit of U.S. Provisional Patent Application Ser. No. 60/812,011 filed on Jun. 7, 2006, titled "A METHOD AND APPARATUS FOR L2TP TUNNELING" and the benefit of U.S. Provisional Patent Application Ser. No. 60/812,012 filed on Jun. 7, 2006 titled "A METHOD AND APPARATUS FOR ADDRESSING MULTIPLE ACCESS POINTS" each of which is hereby expressly incorporated by reference.

FIELD

The present invention is directed to methods and apparatus for communications, and more particularly to methods and apparatus related to routing of packets.

BACKGROUND

Wireless communications systems often include a plurality of access points (APs) and/or other network elements in addition to access terminals, e.g., mobile or other end node devices. In many cases access terminals normally communicate with access points via wireless communications links while other elements in the network, e.g., APs, generally communicate via non-air links, e.g., fiber, cable or wire links. In the case of an airlink, bandwidth is a valuable constrained resource. Accordingly, it is desirable that communication over the airlink be performed in an efficient manner without excessive overhead.

Communications links between access points and/or other network devices are often less constrained from a bandwidth perspective than are air links between access terminals and access points. Accordingly, more overhead in terms of address length and/or other information may be acceptable over backhaul links than over an airlink.

While IP (Internet Protocol) addresses have been used successfully in networks for many years, they tend to include a fair number of bits. For communications over airlinks, it would be desirable if shorter addresses could be used over the airlink. However, it would be desirable that any changes to addresses used over the airlink not preclude the use of IP addresses over other links, e.g., backhaul links.

SUMMARY

Methods and apparatus for communicating between an access terminal (AT) and a device serving the AT by way of an Access Point (AP) are described. In accordance with one feature serving devices may be assigned specific addresses which are interpreted based on the source of the communication, e.g., MAC (Media Access Control) packet, in which the address is used. Such addresses may be interpreted as being of a different type than other addresses which can be interpreted and/or used without taking into account the identity of the sender.

In accordance with one feature of various embodiments, Internet Attachment Points (IAPs) are identified by an address value, referred to as an airlink IAP address. This value is the same for one or more ATs but is interpreted at an AP receiving such IAP address based on information corresponding to the AT which sent the packet including the IAP address.

Thus, the IAP address may be implemented as a special address type that can be used by an AT to identify an AP which is the Internet attachment point for the AT sending the packet including the IAP address. In various embodiments, the IAP address is very short, e.g., 3 or fewer bits. In some embodiments, the IAP address is implemented as an address type indicator where the Address type indicator indicates that the address is of an IAP type. In such a case, no bits are needed beyond that used to indicate the type of address.

By using an IAP address of the type described, a relatively short address can be sent over the airlink when a mobile device is attempting to communicate with its IAP as opposed to embodiments where a full IP address of the IAP is sent over the airlink.

In the case of uplink signals, the AP receiving a packet, e.g., mac packet, with an IAP address, maps the long address to the address of the IAP to be used for communications over links, e.g., backhaul links, which are not air links. This may be done by accessing a set of information, an active AP set, corresponding to the AT sending the packet, which includes the address of the current IAP serving the AT. Thus, the short IAP address may be mapped to the long, e.g., full IP address, of the IAP serving the AT which sent the packet. The determined address of the IAP server is then combined with the payload of the received packet and sent to the IAP corresponding to the AT. Thus, while the same value of the IAP address may be used by different ATs, the mapping may be different since the set of information corresponding to the different ATs may indicate different IAP addresses.

The IAP address information corresponding to different ATs may be updated based on information communicated from one or more devices in the network to the APs. For example, the information may be communicated as part of a set of active AP information maintained for each AT and which is communicated to, or accessible by, APs serving an AT. Alternatively, IAPs may provide APs information about which ATs they are serving at a given time. In addition or as an alternative, an AT may indicate to a current serving AP via a message sent over an airlink, the full address of the IAP which is serving the AP at a particular point in time. The IAP address is then stored and used for the AT until a new IAP address is supplied or the AT ceases to use the AP.

In this manner, an AT and AP can communicate over the airlink using fewer bits to identify an IAP corresponding to the AT than would be required if a long address, e.g., the full IP address of the destination device, was used for communications over an airlink between a serving AP and an AT.

An exemplary method of operating an access point comprises: receiving from an airlink, a first packet communicated from an access terminal, the first packet including information to be communicated to a network device and a predefined airlink address corresponding to said network device, said network device having an IP address which is longer than said predetermined airlink address; and determining an IP address corresponding to said predefined airlink address from information mapping between predefined airlink addresses and IP addresses. Another exemplary method of operating an access point comprises: receiving from a communications link with a network device, a first packet including information to be communicated to an access terminal and a network device IP address indicating the source of the information; and determining a predefined airlink address corresponding to said network device address from information mapping between predefined airlink addresses and IP addresses, said predefined airlink address being shorter than said IP address. An exemplary access point includes: a wireless receiver for receiving from an airlink, a first packet communicated from an access terminal, the first packet including information to be communicated to a network device and a predefined airlink address corresponding to said network device, said network device having an IP address which is longer than said predetermined airlink address; and an IP address determination module for determining an IP address corresponding to said predefined airlink address from information mapping between predefined airlink addresses and IP addresses.

An exemplary method of operating an access terminal to communicate information comprises: generating a packet, said packet including a predetermined airlink address corresponding to a network device, said network device having an IP address which is longer than said predetermined airlink address and information to be communicated to said network device; and transmitting said generated packet over an airlink to an access point. Another exemplary method of operating an access terminal comprises: receiving a packet, said packet including a predetermined airlink address corresponding to a network device, said network device having an IP address which is longer than said predetermined airlink address and information to be communicated to said access terminal; and determining from stored address information and said predetermined airlink address included in said received packet, the network device which is the source of information included in said received packet. An exemplary access terminal comprises: a packet generation module for generating packets, said packets including information to be communicated to a network device and a predetermined airlink address corresponding to said network device, said network device having an IP address which is longer than said predetermined airlink address; and a wireless transmitter for transmitting said generated packets over an airlink to an access point.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE DRAWINGS

FIG. 4 illustrates an exemplary network including a centralized AN architecture and an AT.

DETAILED DESCRIPTION

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Figure 1:
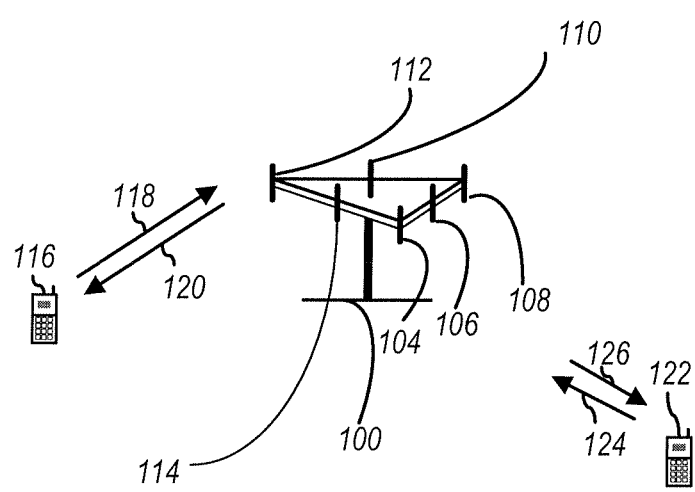
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequencies for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access node, a Node B, a base station or some other terminology. An access terminal may also be called an access device, user equipment (UE), a wireless communication device, terminal, wireless terminal, mobile terminal, mobile node, end node or some other terminology.

Figure 2:
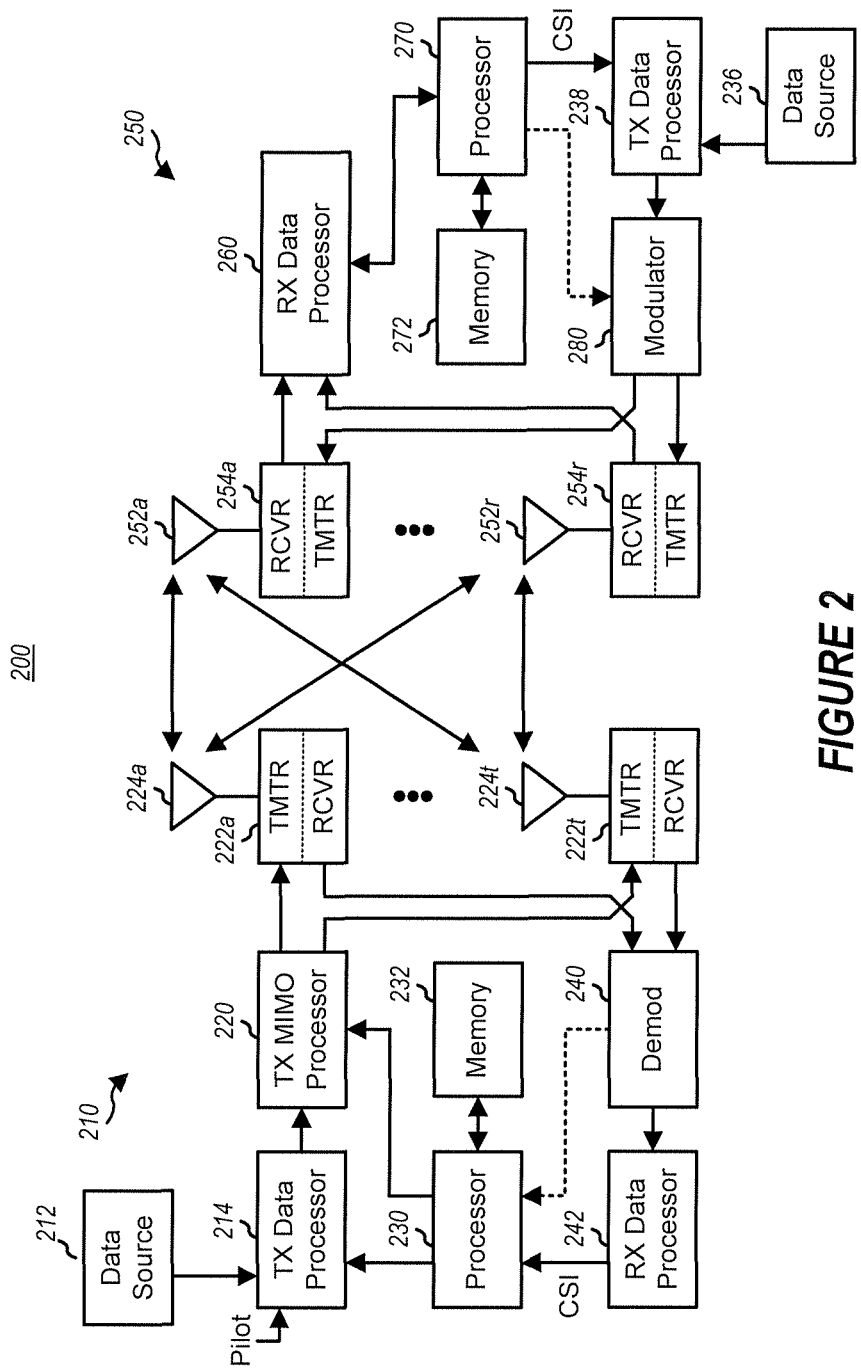
FIG. 2 is a block diagram of an exemplary communication system.

FIG. 2 is a block diagram of an embodiment of an exemplary access point 210 and an exemplary access terminal 250 in a MIMO system 200. At the access point 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for each of the data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter (222a, . . . , 222t) receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver (254a, . . . , 254r) conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers (254a, . . . , 254r) based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted, via antennas (252a, 252r), respectively, back to access point 210.

At access point 210, the modulated signals from access terminal 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights, then processes the extracted message.

Memory 232 includes routines and data/information. Processors 230, 220 and/or 242 execute the routines and uses the data/information in memory 232 to control the operation of the access point 210 and implement methods. Memory 272 includes routines and data/information. Processors 270, 260, and/or 238 execute the routines and uses the data/information in memory 272 to control the operation of the access terminal 250 and implement methods.

In an aspect, SimpleRAN is designed to significantly simplify the communications protocols between the backhaul access network elements in a wireless radio access network, while providing fast handoff to accommodate the demands of low latency applications, such as VOIP, in fast changing radio conditions.

In an aspect, the network comprises access terminals (AT) and an access network (AN).

The AN supports both a centralized and distributed deployment. The network architectures for the centralized and distributed deployments are shown in FIG. 3 and FIG. 4 respectively.

Figure 3:
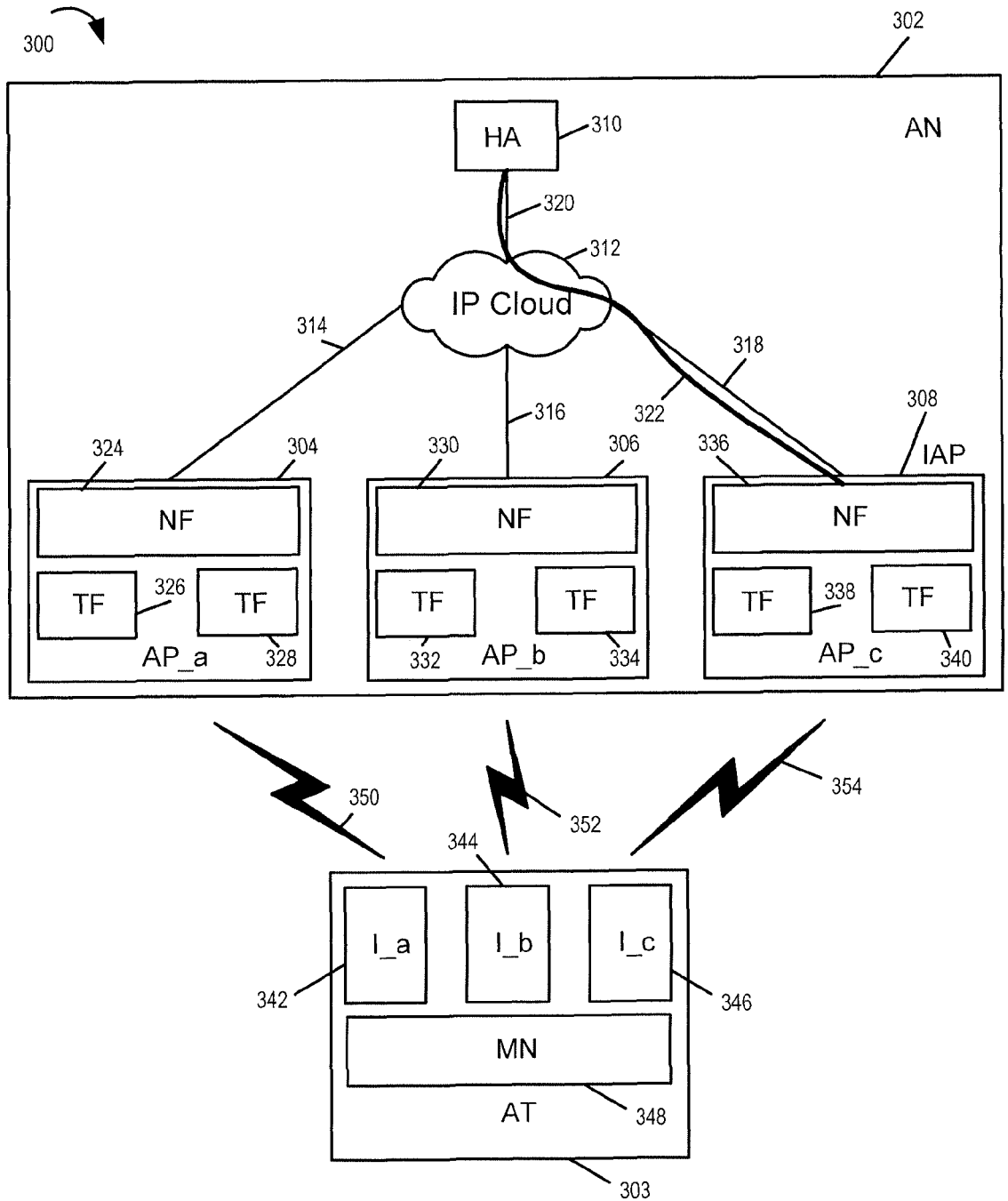
FIG. 3 illustrates an exemplary network including a distributed access network (AN) architecture and an access terminal (AT).
Figure 4:
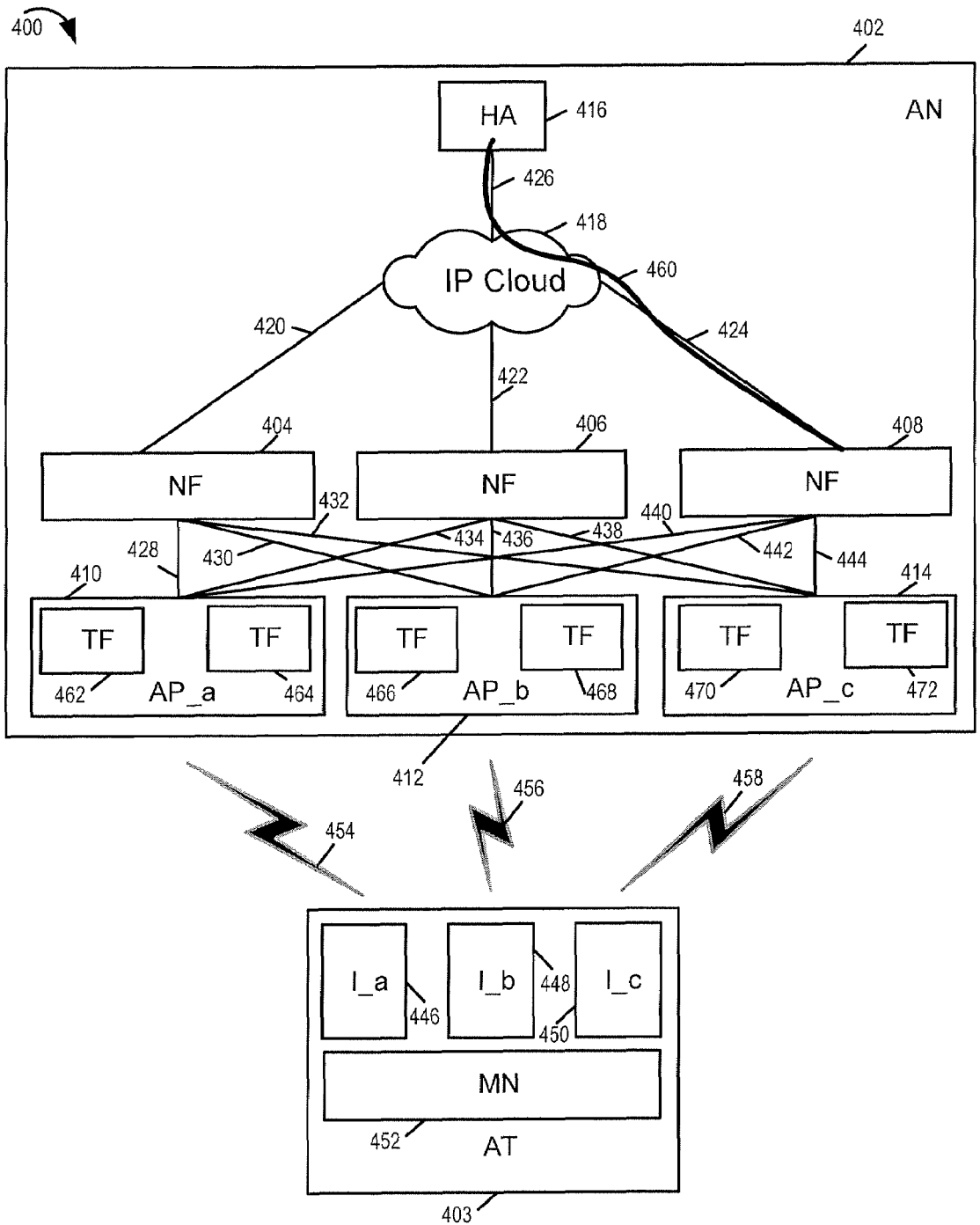

FIG. 3 illustrates an exemplary network 300 including a distributed AN 302 and an AT 303.

In the distributed architecture shown in FIG. 3, the AN 302 comprises access points (AP) and home agents (HA). AN 302 includes a plurality of access points (APa 304, APb 306, APc 308) and home agent 310. In addition, AN 302 includes an IP cloud 312. The APs (304, 306, 308) are coupled to the IP cloud via links (314, 316, 318), respectively. The IP cloud 312 is coupled to the HA 310 via link 320.

An AP includes a:

Network function (NF):
- One per AP, and multiple NFs can serve a single AT.
- A single NF is the IP layer attachment point (IAP) for each AT, i.e., the NF to which the HA forwards packets sent to the AT. In the example of FIG. 4, NF 336 is the current IAP for AT 303, as shown by the line 322 in FIG. 4.
- The IAP may change (L3 handoff) to optimize routing of packets over the backhaul to the AT.
- The IAP also performs the function of the session master for the AT. (In some embodiments, only the session master can perform session configuration, or change the session state.)
- The NF acts as the controller for each of the TFs in the AP and performs functions like allocating, managing and tearing down resources for an AT at the TF.

Transceiver functions (TF) or sector:
  Multiple per AP, and multiple TFs can serve a single AT.
  Provides the air interface attachment for the AT.
  Can be different for the forward and reverse links.
  Changes (L2 handoff) based on radio conditions.
In AN 302 APa 304 includes NF 324, TF 326 and TF 328. In AN 302 APb 306 includes NF 330, TF 332 and TF 334. In AN 302 APc 308 includes NF 336, TF 338 and TF 340.
An AT includes a:
  Interface I_x presented to the mobile node (MN) for each NF in the active set.
  Mobile node (MN) to support IP layer mobility at the access terminal.
  APs communicate using a tunneling protocol defined over IP. The tunnel is an IP-in-IP tunnel for the data plane and an L2TP tunnel for the control plane.

Exemplary AT 303 includes a plurality of Interfaces (I_a 342, I_b 344, I_c 346) and MN 348. AT 303 can be, and sometimes is, coupled to AP_a 304 via wireless link 350. AT 303 can be, and sometimes is, coupled to AP_b 306 via wireless link 352. AT 303, can be, and sometimes is, coupled to AP_c 308 via wireless link 354.

FIG. 4 illustrates an exemplary network 400 including a distributed AN 402 and an AT 403.

Centralized Network Architecture

In a centralized architecture shown in FIG. 4, the NF is no longer logically associated with a single TF, so the AN comprises network functions, access points and home agents. Exemplary AN 402 includes a plurality of NFs (404, 406, 408), a plurality of APs (AP_a 410, AP_b 412, AP_c 414), HA 416 and IP cloud 418. NF 404 is coupled to IP cloud 418 via link 420. NF 406 is coupled to IP cloud 418 via link 422. NF 408 is coupled to IP cloud 418 via link 424. IP cloud 418 is coupled to HA 416 via link 426. NF 404 is coupled to (AP_a 410, AP_b 412, AP_c 414) via links (428, 430, 432), respectively. NF 406 is coupled to (AP_a 410, AP_b 412, AP_c 414) via links (434, 436, 438), respectively. NF 408 is coupled to (AP_a 410, AP_b 412, AP_c 414) via links (440, 442, 444), respectively.

AP_a 410 includes TF 462 and TF 464. AP_b 412 includes TF 466 and TF 468. AP_c 414 includes TF 470 and TF 472.

Since an NF acts as the controller for a TF, and many NFs can be logically associated with a single TF, the NF controller for an AT, i.e., the NF communicating with an AT as a part of the active set, performs the functions of allocating, managing and tearing down resources for the TF at that AT. Therefore, multiple NFs may control resources at a single TF, although these resources are managed independently. In the example of FIG. 4, NF 408 is acting as an IAP for AT 403, as shown by the line 460.

The rest of the logical functions performed are the same as for the distributed architecture.

Exemplary AT 403 includes a plurality of Interfaces (I_a 446, I_b 448, I_c 450) and MN 452. AT 403 can be, and sometimes is, coupled to AP_a 410 via wireless link 454. AT 403 can be, and sometimes is, coupled to AP_b 412 via wireless link 456. AT 403 can be, and sometimes is, coupled to AP_c 414 via wireless link 458.

In systems like DO and 802.20, an AT obtains service from an AP by making an access attempt on an access channel of a particular sector (TF). The NF associated with the TF receiving the access attempt contacts the IAP that is the session master for the AT and retrieves a copy of the AT's session. (The AT indicates the identity of the IAP by including an UATI in the access payload. The UATI may be used as an IP address to directly address the IAP, or may be used to look up the address of the IAP.) On a successful access attempt, the AT is assigned air interface resources such as a MAC ID and data channels to communicate with that sector.

Additionally, the AT may send a report indicating the other sectors it can hear and their signal strengths. The TF receives the report and forwards it to a network based controller in the NF which in turn provides the AT with an active set. For DO and 802.20 as they are implemented today, there is exactly one NF that the AT can communicate with (except during an NF handoff when there are temporarily two). Each of the TFs in communication with the AT will forward the received data and signaling to this single NF. This NF also acts as a network-based controller for the AT and is responsible for negotiating and managing the allocation and tear down of resources for the AT to use with the sectors in the active set.

The active set is therefore the set of sectors in which the AT is assigned air interface resources. The AT will continue to send periodic reports and the network based controller may add or remove sectors from the active set as the AT moves around in the network.

NFs in the active set will also fetch a local copy of the session for the AT when they join the active set. The session is needed to communicate properly with the AT.

For a CDMA air link with soft handoff, on the uplink each of the sectors in the active set may try to decode an AT's transmission. On the downlink, each of the sectors in the active set may transmit to the AT simultaneously, and the AT combines the received transmissions to decode the packet.

For an OFDMA system, or a system without soft handoff, a function of the active set is to allow the AT to switch quickly between sectors in the active set and maintain service without having to make a new access attempt. An access attempt is generally much slower than a switch between members of the active set, since the active set member already has the session and the air interface resources assigned to the AT. Therefore, an active set is useful to do handoff without affecting the QoS service of active applications.

When, an AT and the session master in the IAP negotiate attributes, or alternatively the state of the connection changes, the new values for the attributes or the new state need to be distributed to each of the sectors in the active set in a timely manner to ensure optimal service from each sector. In some cases, for example if the type of headers changes, or security keys change, an AT may not be able to communicate at all with a sector until these changes are propagated to that sector. Thus every member of the active set should be updated when the session changes. Some changes may be less critical to synchronize than others.

There are three main types of state or context found in the network for an AT that has an active connection:

Data state is the state in the network on the data path between the AT and the IAP or an NF during a connection. Data state includes things such as header compressor state or RLP flow states which are very dynamic and difficult to transfer.

Session state is the state in the network on the control path between the AT and the IAP that is preserved when a connection is closed. Session state includes the value of the attributes that are negotiated between the AT and the IAP. These attributes affect the characteristics of the connection and the service received by the AT. For example, an AT may negotiate the QoS configuration for a new application and supply new filter and flow specifications to the network indicating the QoS service requirements for the application. As another example the AT may negotiate the size and type of the headers used in communication with the AN. The negotiation of a new set of attributes is defined as a session change.

Connection state is the state in the network on the control path between the AT and the IAP or an NF that is not preserved when a connection closes and the AT is idle. Connection state may include such information as power control loop values, soft handoff timing, and active set information.

In an IAP or L3 handoff the three types of state may need to be transferred between the old IAP and the new IAP. If only an idle AT can make an L3 handoff, then only the session state needs to be transferred. To support L3 handoff for an active AT, the data and connection state may also need to be transferred.

Systems like DO and 802.20, make L3 handoff of the data state simple by defining multiple routes (or data stacks), where the data state for each route is local to that route, i.e., the routes each have independent data state. By associating each IAP with a different route, the data state does not need to be transferred in a handoff. A further, even better step, is to associate each NF with a different route in which case L3 handoff is completely transparent to the data state, except for possible packet reordering.

Since the data state has multiple routes, the next logical step to support L3 handoff for an active AT is to move the control of the connection state from the IAP and make it local to each NF in the active set. This is done by defining multiple control routes (or control stacks) and defining the air interface so that the control stacks are independent and local to each NF. This may require that some of the negotiating and managing the allocation and tear down of resources of the connection state is transferred to the AT since there is no longer a single NF to manage all the members of the active set. It may also make some additional requirements on the air interface design to avoid a tight coupling between TFs—since different TFs may not share the same NF—in the active set. For instance, to operate in an optimal way, it is preferable to eliminate all tight synchronization between TFs that do not have the same NF, such as power control loops, soft handoff, etc.

Pushing the data and connection state down to the NFs eliminates the need to transfer this state on a L3 handoff, and also should make the NF-to-NF interface simpler.

The system therefore defines multiple independent data and control stacks (called interfaces in FIG. 3 and FIG. 4), in the AT to communicate with different NFs as needed, as well as the addressing mechanisms for the AT and TFs to logically distinguish between these stacks.

Fundamentally, some session state (QoS profile, security keys, attribute values, etc.) cannot be made local to an NF (or IAP) because it is too expensive to negotiate every time there is a NF (or a L3) handoff. Also the session state is relatively static and easy to transfer. What is needed are mechanisms to manage and update the session state as it changes and during IAP handoff where the session master moves.

Optimizing the session state transfer for L3 handoff is a useful feature for every system regardless of the network architecture since it simplifies network interfaces and should also improve the seamlessness of handoff.

A separate but related issue is the AT control of L3 handoff. Today, in systems like DO and 802.20, the AT is aware of the L3 handoff since it allocates and tears down local stacks, but it has no control of when L3 handoff occurs. This is called network-based mobility management. The question is whether to make AT the handoff controller, i.e., to use AT based mobility management?

To support fault tolerance and load balancing, the network needs either to be able to make the handoff or have a mechanism to signal to the AT to do a handoff. Thus if AT based mobility management is used, the network still needs a mechanism to indicate when it should occur.

AT based mobility management has some obvious advantages, such as allowing for a single mechanism for inter and intra technology, or global and local mobility. It also simplifies the network interfaces further by not requiring the network elements to determine when to do handoff.

The primary reason systems like DO and 802.20 use network based mobility is that AT based mobility is not optimized to work fast enough to support voice. A secondary reason is the tunneling overhead introduced by terminating the mobile IP tunnels (for MJPv6) in the AT. The mobility latency can be solved by forwarding data using tunnels between the current and previous forward link serving sector, as well as possibly using bicasting, where the data is sent to multiple NFs in the active set simultaneously.

In SimpleRAN, there are two types of handoff. For example, Layer 2 or L2 handoff refers to changing of the forward link or reverse link serving sector (TF) and L3 handoff refers to changing of the IAP. L2 handoff should be as fast as possible in response to changing radio conditions. Systems like DO and 802.20 use PHY layer signaling to make L2 handoff fast.

L2 handoff is transfer of the serving sector TF for the forward (FL) or reverse (RL) links. A handoff occurs when the AT selects a new serving sector in the active set based on the RF conditions seen at the AT for that sector. The AT performs filtered measurements on the RF conditions for the forward and reverse links for all sectors in the active set. For instance, in 802.20 for the forward link the AT can measure the SINR on the acquisition pilots, the common pilot channel (if present), and the pilots on the shared signaling channel, to select its desired FL serving sector. For the reverse link, the AT estimates the CQI erasure rate for each sector in the active set based on the up/down power control commands to the AT from the sector.

L2 handoff is initiated when the AT requests a different FL or RL serving sector via a reverse link control channel. Dedicated resources are assigned at a TF when it is included in the active set for an AT. The TF is already configured to support the AT before the handoff request. The target serving sector detects the handoff request and completes the handoff with the assignment of traffic resources to the AT. The forward link TF handoff requires a round trip of messaging between the source TF or IAP and target TF in order to receive data for the target TF to transmit. For reverse link TF handoff, the target TF may immediately assign resources to the AT.

L3 handoff is the transfer of the IAP. L3 handoff involves a HA binding update with the new IAP and requires a session transfer to the new IAP for the control-plane. L3 handoff is asynchronous to L2 handoff in the system so that L2 handoff is not limited by MJPv6 handoff signaling speed.

L3 handoff is supported over the air in the system by defining an independent route to each NF. Each flow provides multiple routes for transmission and reception of higher layer packets. The route indicates which NF processed the packet. For example, one NF may be associated at the TF and over the air as Route A, while another NF may be associated with Route B. A serving TF can simultaneously send packets to an AT from both Route A and Route B. i.e., from both NFs, using a separate and independent sequence space for each.

There are two key ideas in the system design to ensure the QoS treatment for a mobile and its traffic is retained over each handoff mode: Decoupling of L2 and L3 handoff.

Reserving air interface resources and fetching the session at the target NF or TF before the handoff occurs to minimize the data flow interruption during the handoff. This is done by adding the target TF and NF to the active set.

The system is designed to separate L2 and L3 handoff in order to allow the system to support EF traffic during high rates of L2 handoff. L3 handoff requires a binding update, which is limited to a rate of 2 to 3 per second. In order to allow a faster L2 handoff rate of 20 to 30 Hz, L2 and L3 handoff are designed to be independent and asynchronous.

For L2 handoff, the active set management allows all the TFs in the active set to be configured and dedicated resources assigned in order to be ready to serve the AT in the event of an L2 handoff.

Consider a Mobile Wireless Communication System with multiple access points (AP) that provide service to access terminals (AT). Many systems have an active set, which is a set of APs that have assigned resources to the AT. At a given point in time, an AT may be within range of radio communication with one of the APs, or for the purpose of battery power optimization and radio interference reduction, may communicate only with one carefully selected AP (serving AP). The problem considered here is the delivery of messages and data between the various APs in the system, such that the serving AP can deliver messages to and from the AT.

APs can exchange data over an L2TP (layer two tunneling protocol) tunnel. If AP1 has to send a message or data to the AT, while AP2 is the serving AP, then AP1 first uses the L2TP tunnel to deliver the packet to AP2, and AP2 delivers this packet to the AT using a mechanism including the use of an identifier bit, e.g., a reprocess bit.

Similarly, if the AT has to send a message or data to AP1, while AP2 is serving, it sends the message to AP2 with a remote bit set, and AP2 sends this packet to AP1 via the L2TP tunnel.

The L2TP header includes the following fields
1. UserID: This is the address of the user to which the L2TP packet is addressed
2. ForwardOrReverse: This field identifies if the AT is the destination or the source of the packet.
3. FlowID: In one design, this field may be present only in forward link packets (packets destined to the AT), and it identifies the flow that the serving AP should use to deliver the packet to the AT
4. SecurityField: In one design, this field may be present only in reverse link packets (packets originated at the AT). The SecurityField may include an IsSecure bit, a KeyIndex field (to identify the keys used for security operation) and a CryptoSync field.

In an aspect, forward Link L2TP Packets are communicated. Here we describe the process used by an AP to send and receive a forward link L2TP packet.

An AP sends a forward link L2TP packet when it has data or a message to send to the AT. The AP forms the appropriate header and sends the L2TP packet to the serving AP (or if it does not know the identity of the serving AP, possibly by routing the packet through a central node—the IAP).

When an AP receives a forward link L2TP packet, it does the following steps
1 If the AP is not serving for the given UserID (in the L2TP header), it forwards the packet to the current serving AP (possibly by routing the packet through a central node— the IAP)
2. If the AP is serving for the given UserID, it delivers the packet to the AT using the RLP flow and associated QoS attributes for the given FlowID (in the L2TP header).

In an aspect, reverse Link L2TP Packets are communicated. Here we describe the process used by an AP to send and receive a reverse link L2TP packet.

An AP sends a reverse link L2TP packet when it receives a packet from the AT, and the remote bit is set for that packet. The first step for the AP sending the L2TP packet is address determination.

Address Determination: If the remote bit for the packet is set, the packet also includes an address field to identify which AP this packet should be delivered to (target AP). The receiving AP maps the address field to the IP address of the AP. This mapping may be established by
1. An AT assisted method wherein messages describing a mapping are sent from the AT to the AP, and the mapping information is then used by the AP to map between the address used over the airlink and the IP address.
2. A network assisted method whereby mapping information provided by a central entity or by the target AP is used.
3. A PilotPN based method. In this case the address field may simply be equal to the PilotPN (or some upper bits of the PilotPN) of the AP corresponding to the address. The receiving AP knows the PilotPN and IP addresses of all neighboring APs as part of the network configuration (which itself may be network assisted) and uses this information to map between the PN based address and corresponding IP address.
4. An IAP address method where a special address type is used by the AT to identify the AP which is the Internet attachment point for the AT. Each AP in an active set of APs corresponding to an AT knows the IP address of the IAP for the particular AT and can map between the IAP address and IP address of the AT's IAP.

After address determination, the AP sending the L2TP packet may also insert security related fields if needed, and as determined by the security design. When an AP receives a reverse link L2TP packet, it does the following steps
1. If the AP is not serving the given UserID indicated in a received packet (in the L2TP tunnel), it ignores the packet
2. If the AP is serving the given UserID of the received packet, it processes the packet as if the packet were received from its own MAC layer. The processing of the packet may depend on the SecurityField received in the L2TP tunnel.

Figure 5:
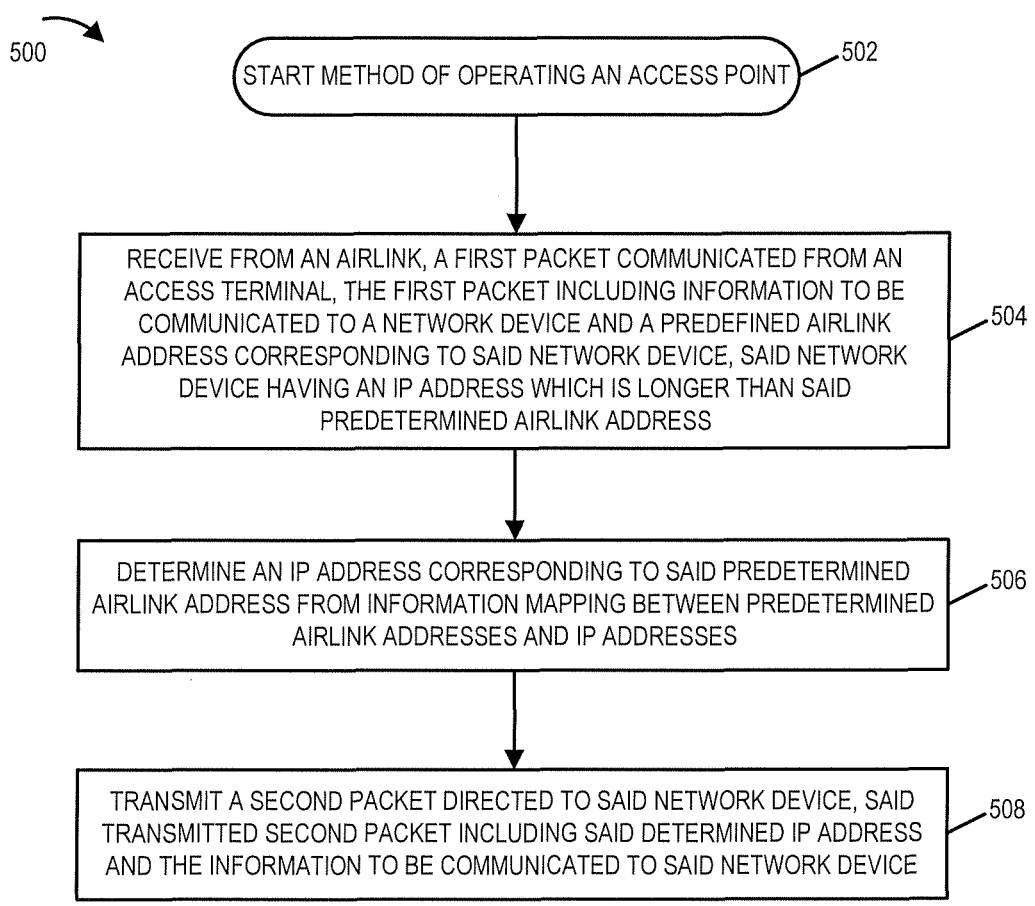
FIG. 5 is a flowchart of an exemplary method of operating an access point in accordance with various embodiments.

FIG. 5 is a flowchart 500 of an exemplary method of operating an access point in accordance with various embodiments. Operation starts in step 502 where the access point is powered on and initialized and proceeds to step 504.

In step 504, the access point receives from an airlink a first packet communicated from an access terminal, the first packet including information to be communicated to a network device and a predefined airlink address corresponding to said network device, said network device having an IP address which is longer than said predetermined airlink address. Operation proceeds from step 504 to step 506.

In step 506, the access terminal determines an IP address corresponding to said predetermined airlink address from information mapping between predetermined airlink addresses and IP addresses. In various embodiments, determining an IP address corresponding to said predefined airlink address includes accessing a database including information mapping predefined airlink addresses to IP addresses of network devices. In some embodiments, the step of determining an IP address corresponding to said predefined airlink address is performed as a function of information identifying the access terminal from which the first packet was received, said information mapping predefined airlink addresses to IP addresses including information mapping a predefined airlink address to different IP addresses depending on the source of the packet which included the predefined mapping.

In various embodiments, the predefined address is an Internet Attachment Point (IAP) address. In some embodiments, the predefined address is a session controller address. In some embodiments, the predefined airlink addresses are reserved addresses and at least one of said predefined airlink addresses in said database is short or shorter than any other address used by said access terminal over an airlink. In one exemplary embodiment at least one of the predefined addresses includes at most two bits. Operation proceeds from step 506 to step 508.

In step 508, the access terminal transmits a second packet directed to said network device, said transmitted second packet including said determined IP address and the information to be communicated to said network device.

Figure 6:
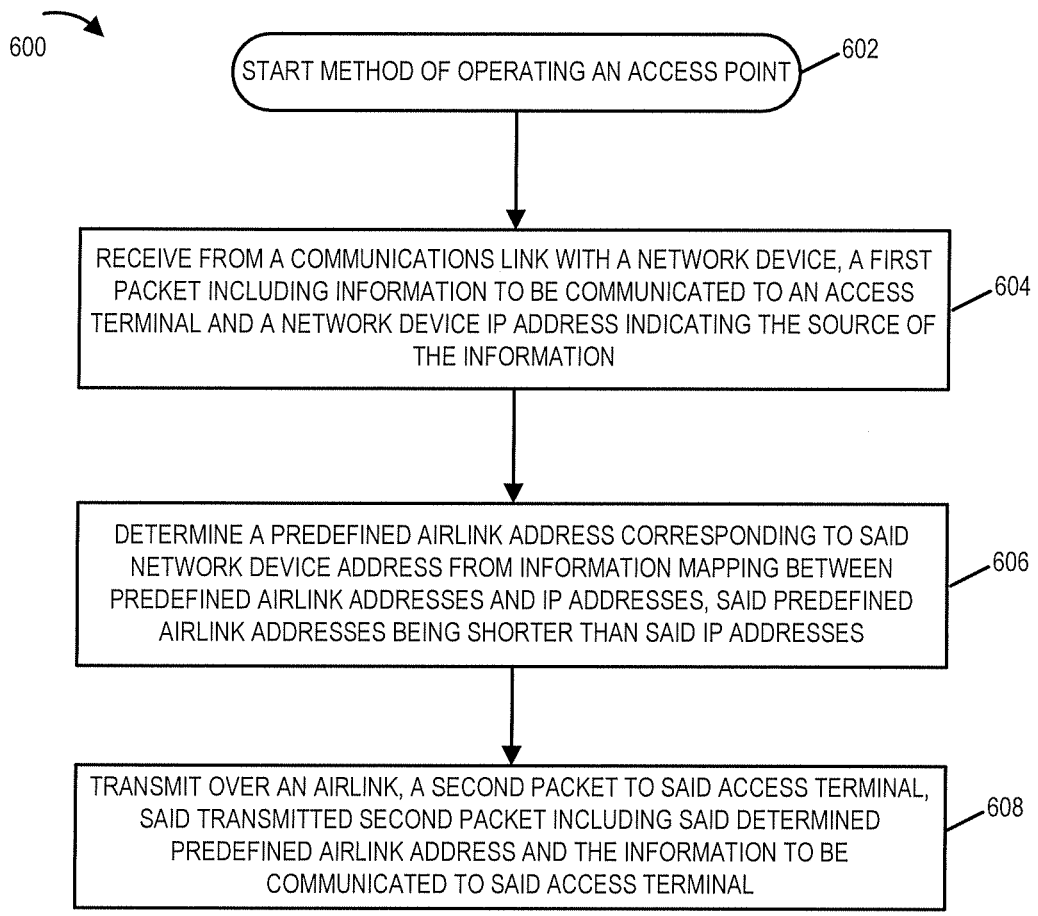
FIG. 6 is a flowchart of an exemplary method of operating an access point in accordance with various embodiments.

FIG. 6 is a flowchart 600 of an exemplary method of operating an access point in accordance with various embodiments. Operation starts in step 602, where the access terminal is powered on and initialized and proceeds to step 604. In step 604, the access point receives from a communications link with a network device, a first packet including information to be communicated to an access terminal and a network device IP address indicating the source of the information. Operation proceeds from step 604 to step 606.

In step 606, the access terminal determines a predefined airlink address corresponding to said network device address from information mapping between predefined airlink addresses and IP addresses, said predefined airlink addresses being shorter than said IP addresses. In various embodiments, said step of determining an IP address corresponding to said predefined airlink address includes accessing stored information including information mapping IP addresses of network devices to predetermined airlink addresses. In some such embodiments, the stored information indicates a mapping of multiple network devices of the same type by having different IP addresses to the same predetermined airlink address. In some embodiments, the predefined address is an Internet Attachment Point address. In some embodiments, the predefined address is a session controller address. In various embodiments, the predefined airlink addresses are reserved addresses, at least one of the predefined addresses being as short or shorter than any other address used by said access terminal over an airlink. In one exemplary embodiment, at least one of the predefined addresses includes at most two bits. Operation proceeds from step 606 to step 608.

In step 608, the access point transmits over an airlink, a second packet to said access terminal, said transmitted second packet including said determined predefined airlink address and the information to be communicated to said access terminal.

Figure 7:
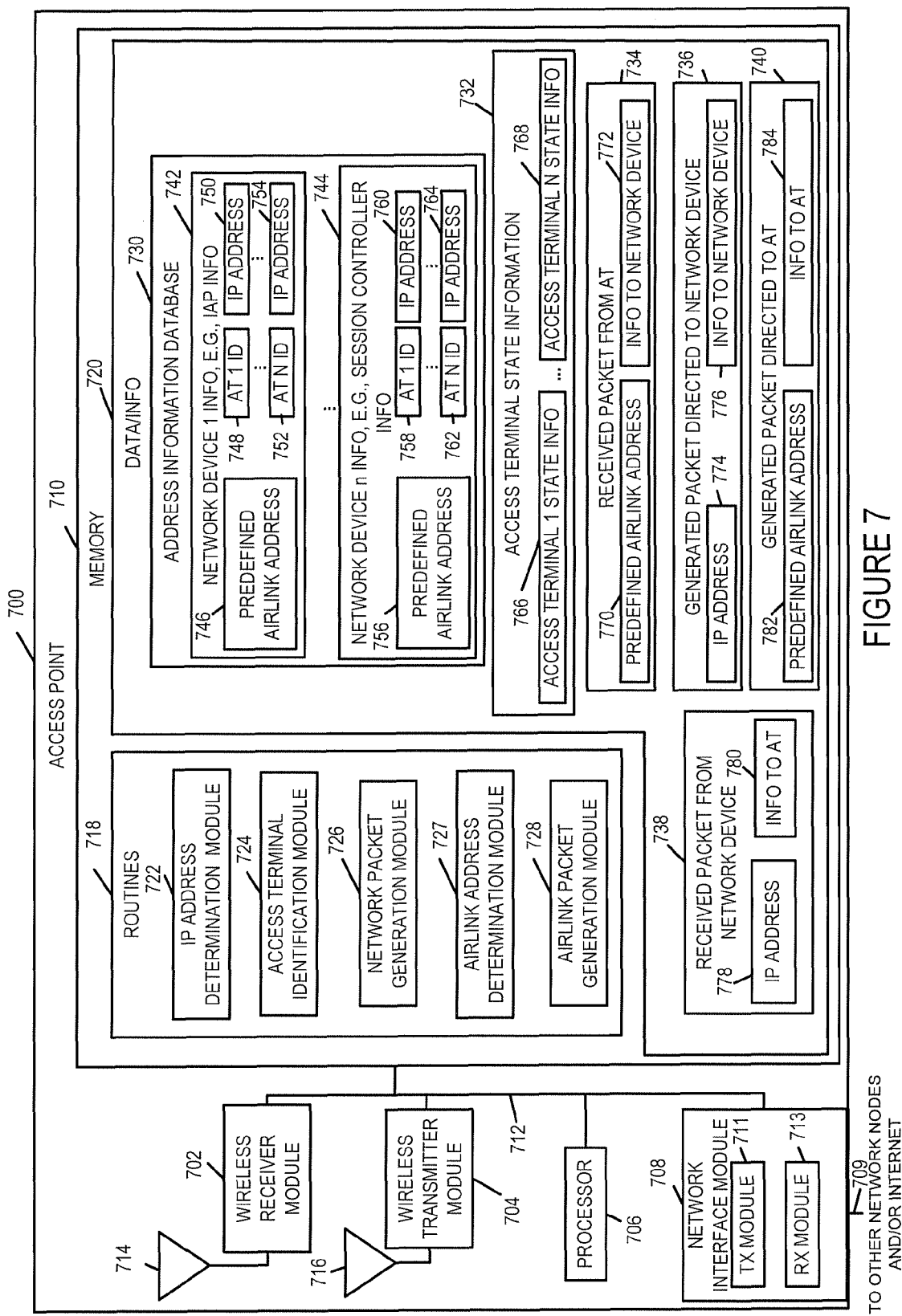
FIG. 7 is a drawing of an exemplary access point in accordance with various embodiments.

FIG. 7 is a drawing of an exemplary access point 700 in accordance with various embodiments. Exemplary access point 700 includes a wireless receiver module 702, a wireless transmitter module 704, a processor 706, a network interface module 708 and memory 710 coupled together via a bus 712 over which the various elements may interchange data and information. Memory 710 includes routines 718 and data/information 720. The processor 706, e.g., a CPU, executes the routines 718 and uses the data/information 720 in memory 710 to control the operation of the access point and implement methods, e.g., a method in accordance with flowchart 500 of FIG. 5 and/or flowchart 600 of FIG. 6.

Wireless receiver module 702, e.g., an OFDM and/or CDMA receiver, is coupled to receiver antenna 714 via which the access point receives uplink signals from access terminals. Wireless receiver module 702 receives a packet from an access terminal, said received packet including information to be communicated to a network device and a predefined airlink address corresponding to the network device, said network device having an IP address which is longer than said predefined airlink address. Received packet from AT 734 is an example of a received packet received by wireless receiver module 702.

Wireless transmitter module 704, e.g., an OFDM and/or CDMA transmitter, is coupled to transmit antenna 716 via which the access point transmits downlink signals to access terminals. Wireless transmitter module 704 transmits, over a wireless communications link, downlink packets directed to ATs. Exemplary generated packet directed to an AT 740 is a packet transmitted by wireless transmitter module 704.

In some embodiments multiple antennas and/or multiple antenna elements are used for reception. In some embodiments multiple antenna and/or multiple antenna elements are used for transmission. In some embodiments at least some of the same antennas or antenna elements are used for both transmission and reception. In some embodiments, the access point uses MIMO techniques.

Network interface module 708 couples the access point 700 to other network nodes, e.g., other access points, AAA nodes, home agent nodes, etc., and/or the Internet via network link 709. Network interface module 708 includes a transmitter module 711 and a receiver module 713. Transmitter module 711, e.g., a backhaul network transmitter, transmits a packet directed to a network device, said transmitted packet including a determined IP address and information to be communicated to the network device. For example, transmitter module 711 transmits generated packet directed to network device 736. Receiver module 713, e.g., a backhaul network receiver, receives from a communications link with a network device, a packet including information to be communicated to an access terminal and a network device IP address indicating the source of the information. Received packet from network device 738 is such an exemplary packet received via receiver module 713.

Routines 718 include an IP address determination module 722, an access terminal identification module 724 and a network packet generation module 726, an airlink address determination module 727, and an airlink packet generation module 728. Data/information 720 includes an address information database 730, access terminal state information 732, a received packet from an access terminal 734, a generated packet directed to a network device 736, a received packet form a network device 738 and a generated packet directed to an access terminal 740.

Address information database 730 includes address information corresponding to a plurality of different types of network devices (network device 1 information 742, . . . , network device n information 744). Address information database 730, which is coupled to the IP address determination module 722, includes information mapping between predefined airlink addresses and IP addresses of network devices. Address information database 730 is also coupled to airlink address determination module 727. Network device 1 information 742, e.g., Internet Attachment Point (IAP) information, includes a predefined airlink address 746, access terminal identification information (AT 1 ID info 748, . . . , AT N ID information 752) and IP address information (IP address 750, . . . , IP address 754). Corresponding to network device 1, e.g., an IAP, each of the ATs identified by (AT 1 ID 748, . . . , AT N ID 752) use the same predefined airlink address 746. However, the predefined airlink address 746 can, and sometimes does, correspond to different IP addresses. For the AT identified by AT ID 1 748, predefined airlink address 746 corresponds to IP address 750, while for the AT identified by AT ID N 752, the predefined airlink address 746 corresponds to IP address 754. IP addresses 750 and 754 can be and sometimes are different. Network device n information 744, e.g., Session Controller information, includes a predefined airlink address 756, access terminal identification information (AT 1 ID info 758, . . . , AT N ID information 762) and IP address information (IP address 760, . . . , IP address 764). Corresponding to network device n, e.g., a Session Controller, each of the ATs identified by (AT 1 ID 758, . . . , AT N ID 762) use the same predefined airlink address 756. However, the predefined airlink address 756 can, and sometimes does, correspond to different IP addresses. For the AT identified by AT ID 1 758, predefined airlink address 756 corresponds to IP address 760, while for the AT identified by AT ID N 762, the predefined airlink address 756 corresponds to IP address 764. IP addresses 760 and 764 can be and sometimes are different.

In some embodiments, the predefined airlink addresses are reserved addresses. In some such embodiments, at least one of the predefined airlink addresses in said database 730 is short or shorter than any other address used by the access terminal over an airlink.

Access terminal state information 732 includes state information corresponding to a plurality of different access terminals (access terminal 1 state information 766, . . . , access terminal N state information 768).

Received packet from an access terminal 734 includes a predefined airlink address 770 and information to be communicated to a network device 772. Generated packet directed to a network device 736 includes an IP address 774 and information to the network device 776.

Received packet from a network device 738 includes an IP address 778 and information to an access terminal 780. Generated packet directed to an access terminal 740 includes a predefined airlink address 782 and information directed to an access terminal 784.

IP address determination module 722 determines an IP address corresponding to a predefined airlink address from information mapping between predefined airlink addresses and IP addresses. For example, the IP address determination module 722 determines IP address 774 from received predefined airlink address 770 and address information database 730.

Access terminal identification module 724 provides information identifying the access terminal from which a packet was received, to said IP address determination module 722, said IP address determination module determining an IP address corresponding to said predefined airlink address as a function of the information identifying the access terminal. The information mapping predefined airlink addresses to IP addresses includes information mapping a predefined airlink address to different IP addresses depending on the source of the packet which included the predefined address and the information. For example, if the source of received packet from AT 734 was the access terminal identified by AT ID 1 748 and the predefined airlink address was predefined airlink address 746, then the IP address is IP address 750; however, if the source of received packet from AT 734 was the access terminal identified by AT ID N 752 and the predefined airlink address was predefined airlink address 746, then the IP address is IP address 754.

Airlink address determination module 727 determines a predefined airlink address corresponding to a network device from said information mapping between predefined airlink addresses and IP addresses, said predefined airlink address being shorter than said IP address. For example, airlink address determination module 727 determines predefined airlink address 782 to be used in generated packet directed to AT 740 from IP address 778 of received packet from network device 738 and mapping information in address information database 730 corresponding to the AT to which the packet is directed.

Airlink packet generation module 728 generates packets to be transmitted over an airlink, said generated packets including a predetermined airlink address corresponding to a network device, e.g., the network device which is the source of the information being conveyed by the packet. Generated packet directed to AT 740 is an exemplary packet generated by airlink packet generation module 728. Network packet generation module 726 generates packets directed to a network device, e.g., an access terminal serving as an IAP for an access terminal or a session controller for an AT. Generated packet directed to network device 736 is an exemplary packet generated by network packet generation module 726. Network packet generation module 726 uses an IP address determined by IP address determination module 722 in generating a packet, e.g., packet 736.

Figure 8:
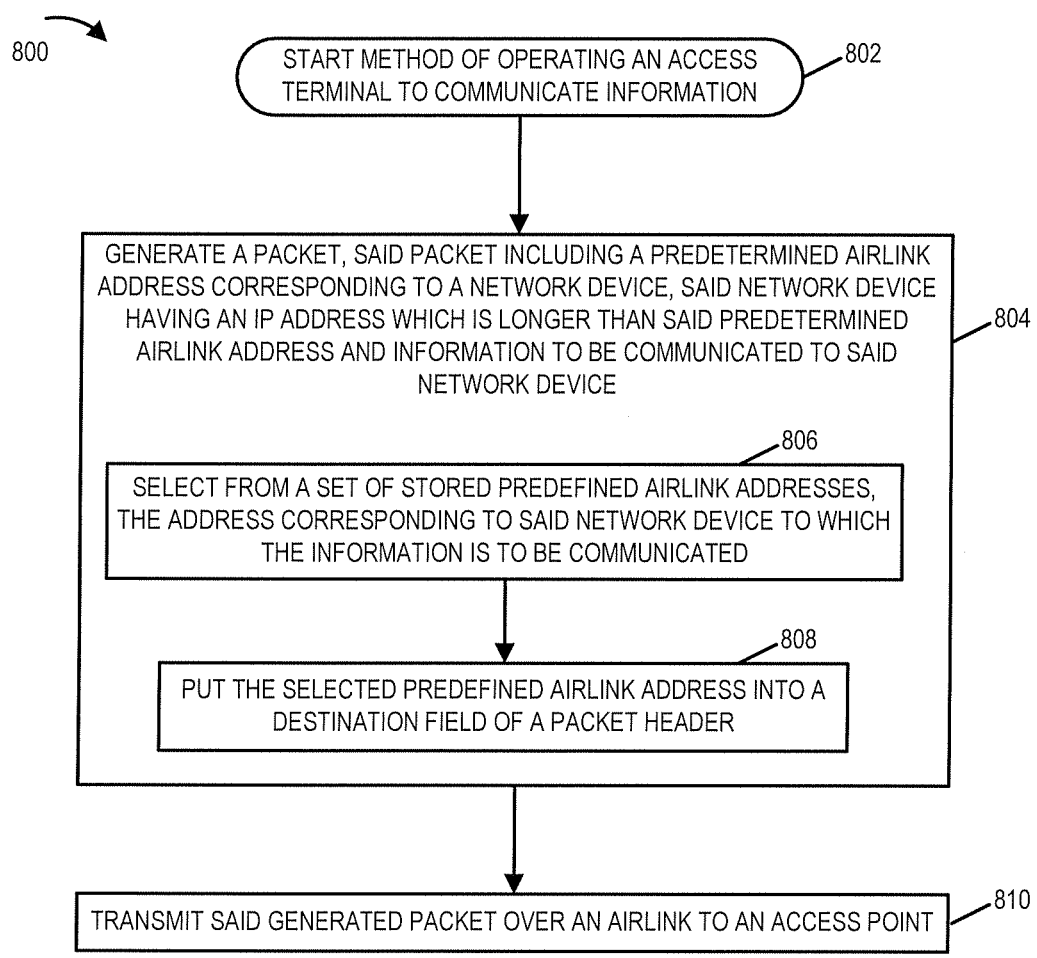
FIG. 8 is a flowchart of an exemplary method of operating an access terminal to communicate information.

FIG. 8 is a flowchart 800 of an exemplary method of operating an access terminal to communicate information. Operation starts in step 802, where the access terminal is powered on and initialized and proceeds to step 804. In step 804 the access terminal generates a packet, said packet including a predefined airlink address corresponding to a network device, said network device having an IP address which is longer than said predetermined airlink address and information to be communicated to said network device. In some embodiments, the generated packet is a MAC packet. Step 804 includes sub-steps 806 and 808. In sub-step 806 the access terminal selects from a set of stored predefined airlink addresses, the address corresponding to said network device to which the information is to be communicated. Then, in sub-step 808, the access terminal puts the selected predefined airlink address into a destination field of a packet header.

In some embodiments, the predefined airlink addresses are reserved addresses and at least one of the predefined airlink addresses in said stored set is shorter than any other addresses used by said access terminal over an airlink. In some embodiments, the network device can be and sometime is an Internet Attachment Point used by the access terminal to obtain access to the network. In some embodiments, the network device is a session controller used to control communications session in which the access terminal is a participant.

In some embodiments, the predefined airlink address used by said access terminal to communicate with the network device is the same as the predefined airlink address used by other access terminals to communicate with other network devices, and the generated packet includes an access terminal identifier used by a receiving device in combination with said predefined airlink address to determine the IP address of said network device to which the information in the packet is being communicated. In some embodiments, the network device is a session controller used to control communications session in which the access terminal is a participant. In various embodiments, the network devices which are accessed by different access terminals using the same predefined address are the same type of network device.

Operation proceeds from step 804 to step 810. In step 810 the access terminal transmits the generated packet over an airlink to an access point.

In one embodiment, the network device is an Internet Attachment Point (IAP) and when the IAP for the access terminal changes due to a change in location or a network consideration, the reserved address used by the access terminal to access the AT's current Internet Attachment Point remains the same but the mapping between the reserved address and the IP of the current IAP for AT changes when the access terminal changes Internet Attachment Points. Thus, in some embodiments, a reserved airlink address, e.g., a reserved airlink address for IAP functionality, used by an AT may be viewed from the AT's perspective as a virtual address which can be and sometimes is, associated with different physical devices at different times, e.g., different physical devices serving the same function for the AT. In some embodiments, the AT need not be, and is not, aware of the IP address of the current IAP for the AT at a given time.

Figure 9:
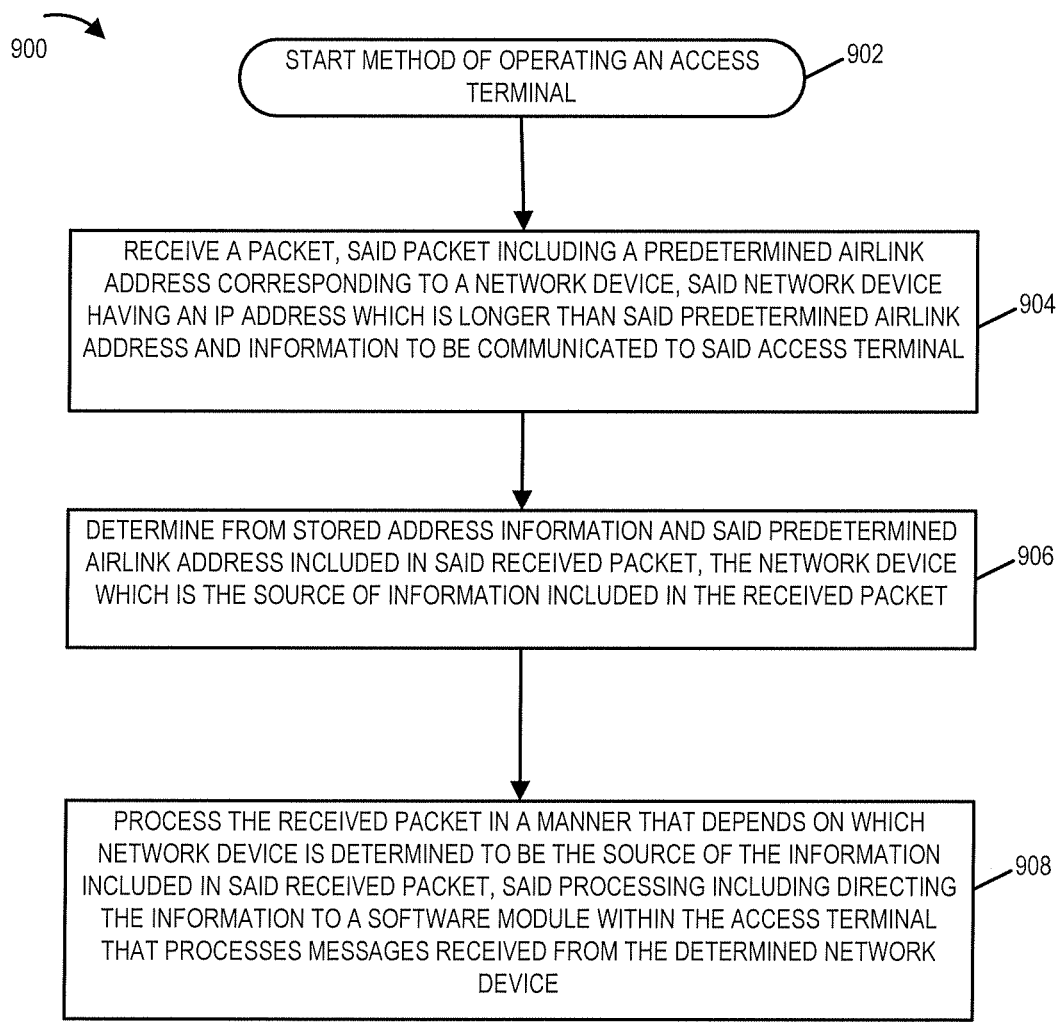
FIG. 9 is a flowchart of an exemplary method of operating an access terminal in accordance with various embodiments.

FIG. 9 is a flowchart 900 of an exemplary method of operating an access terminal in accordance with various embodiments. Operation starts in step 902 where the access terminal is powered on and initialized and proceeds to step 904. In step 904, the access terminal receives a packet, e.g., a MAC packet, said packet including a predetermined airlink address corresponding to a network device, said network device having an IP address which is longer than said predetermined airlink address and information to be communicated to said access terminal. Operation proceeds from step 904 to step 906. In step 906 the access terminal determines from the stored address information and said predetermined airlink address included in said received packet, the network device which the source of the information included in the received packet.

Operation proceeds from step 906 to step 908. In step 908, the access terminal processes the received packet in a manner which depends on which network device is determined to be the source of the information included in the received packet, said processing including directing the information to a software module within the access terminal that processes messages received from the determined network device.

In some embodiments, the received packet includes the predetermined airlink address in a source field of a packet header included in said received packet. In various embodiments, the predefined airlink address is a reserved address, said predefined airlink address being as short or shorter than any other addresses used by said access terminal over an airlink. In one such embodiment, the predefined address includes at most two bits.

In some embodiments, the network device is an Internet Attachment Point used by said access terminal to obtain access to the network. In various embodiments, the predefined airlink address used by the access terminal to communicate with the network device is the same as the predefined airlink address used by other access terminals to access other network devices. In some such embodiments, the network device and the other network devices are Internet Attachment Points.

In various embodiments, the network device is a session controller used to control communications sessions in which the access terminal is a participant.

Figure 10:
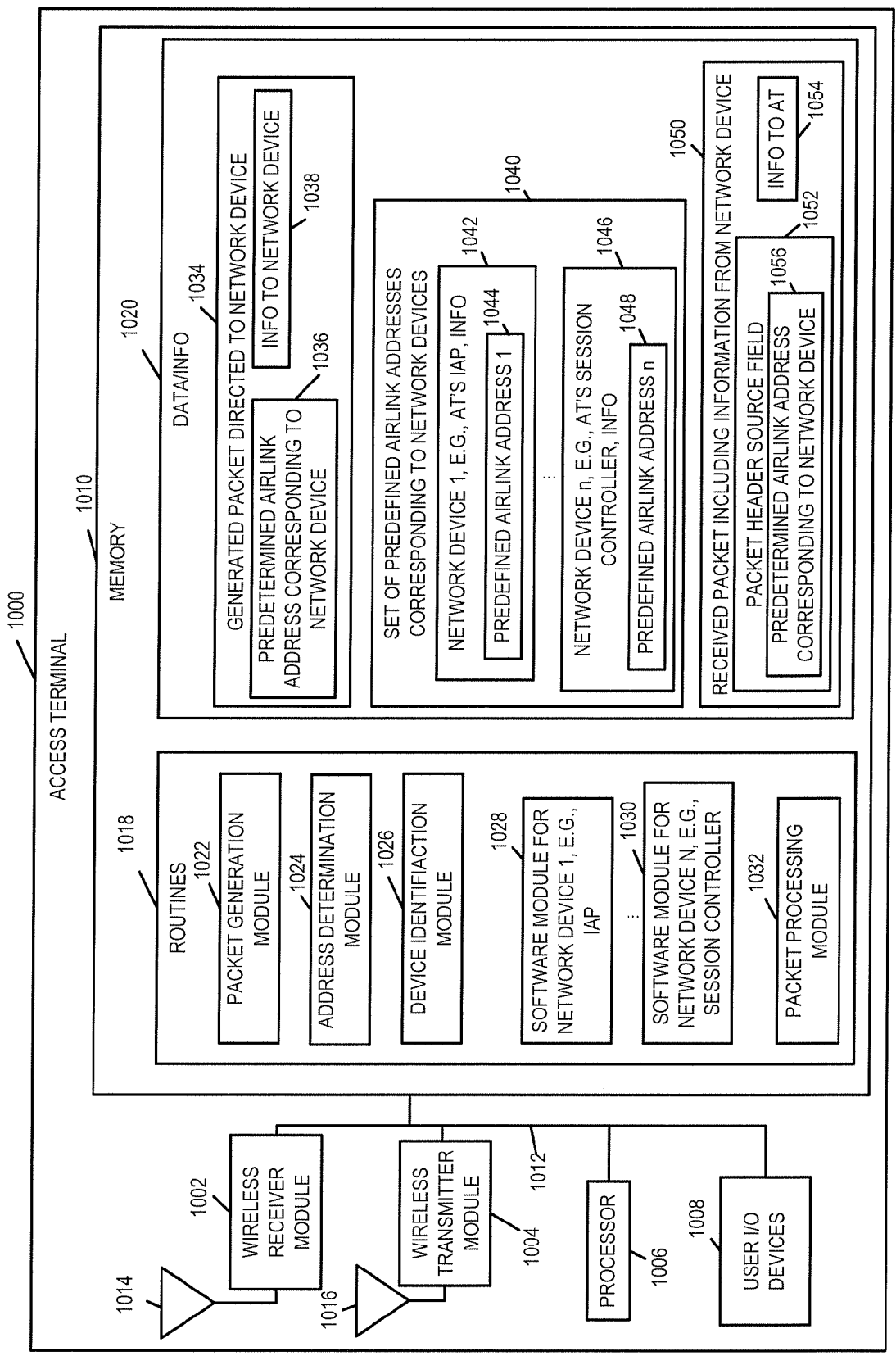
FIG. 10 is a drawing of an exemplary access terminal in accordance with various embodiments.

FIG. 10 is a drawing of an exemplary access terminal 1000 in accordance with various embodiments. Exemplary access terminal 1000 can, and sometimes does, communicate information to a remote device through an access point. Exemplary access terminal 1000 includes a wireless receiver module 1002, a wireless transmitter module 1004, a processor 1006, user I/O devices 1008 and memory 1010 coupled together via a bus 1012 over which the various elements may interchange data and information. Memory 1010 includes routines 1018 and data/information 1020. The processor 1006, e.g., a CPU, executes the routines 1018 and uses the data/information 1020 in memory 1010 to control the operation of the access terminal and implement methods, e.g., the methods of flowchart 800 of FIG. 8 and flowchart 900 of FIG. 9.

Wireless receiver module 1002, e.g., a CDMA or OFDM receiver, is coupled to receive antenna 1014 via which the access terminal 1000 receives downlink signals from access points. Receiver module 1002 receives a packet including a received predetermined airlink address corresponding to a communicating network device, e.g., received packet 1050.

Wireless transmitter module 1004, e.g., a CDMA or OFDM transmitter, is coupled to transmit antenna 1016 via which the access terminal 1000 transmits uplink signals to access points. Wireless transmitter module 1004 transmits generated packets, e.g., generated packet 1034, over an airlink to an access point.

In some embodiments, the same antenna is used for transmission and reception. In some embodiments multiple antennas and/or multiple antenna elements are used for reception. In some embodiments multiple antenna and/or multiple antenna elements are used for transmission. In some embodiments at least some of the same antennas or antenna elements are used for both transmission and reception. In some embodiments, the access terminal uses MIMO techniques.

User I/O devices 1008 include, e.g., microphone, keyboard, keypad, switches, camera, speaker, display, etc. User I/O devices 1008 allow a user of access terminal 1000 to input data/information, access output data/information, and control at least some functions of the access terminal 1000, e.g., initiate a communications session with a peer node, e.g., another access terminal.

Routines 1018 include a packet generation module 1022, an address determination module 1024, a device identification module 1026, a plurality of software modules corresponding to different network devices (software module for network device 1 1028, e.g., AT's IAP, . . . , software module for network device N 1030, e.g., AT's session controller), and a packet processing module 1032. Data/information 1020 includes a generated packet directed to a network device 1034, a set of predefined airlink addresses corresponding to network devices 1040, and a received packet including information from a network device 1050. The generated packet directed to a network device 1034 includes a predetermined airlink address corresponding to the network device 1036 and information to be communicated to the network device 1038. The set of predefined airlink addresses corresponding to network devices 1040 includes a plurality of different predefined airlink addresses associated with different network devices (network device 1, e.g., AT's IAP, information 1042, . . . , network device n, e.g., AT's session controller, information 1046). Network device 1, e.g., AT's IAP information 1042 includes predefined airlink address 1 1044, while network device n, e.g., AT's session controller, information 1046 includes predefined airlink address n 1048.

In some embodiments the predefined airlink addresses are reserved addresses, and at least one of the predefined airlink addresses in said stored set of airlink addresses 1040 is as short or shorter than any other addresses used by said access terminal over an airlink. In various embodiments, a predefined airlink address used by access terminal 1000 to communicate with a network device is the same as the predefined airlink address used by other access terminals to communicate with other network devices. In some such embodiments, a generated packet including an access terminal identifier is used by a receiving device in combination with said predefined airlink address to determine the IP address of said network device to which the packet is to be communicated. In various embodiments, the other network devices are the same type of network device as the network device to which the packet from access terminal 1000 is directed. For example, the network device to which the packet from access terminal 1000 is directed is, e.g., AT's 1000 IAP, while the other network devices may be IAP's corresponding to different AT's in the system. The IAPs may be of the same type, e.g., the IAPs are access points; however IAP's corresponding to different ATs may and sometimes do correspond to different physical devices.

In various embodiments, the network device is an Internet Attachment Point, and the IAP for the AT 1000 changes due to a change in access terminal location, and the reserved address used by the access terminal to communicate with the IAP remains the same but mapping between the reserved address and the IP addresses, e.g., in an access point in the system, changes when the access terminal changes Internet Attachment Points. In various embodiments, the network device is an Internet Attachment Point, and the IAP for the AT 1000 changes due to a change in network considerations, e.g., loading issues, device fault issues, routing considerations, etc., and the reserved address used by the access terminal to communicate with the AT's IAP remains the same but mapping between the reserved address and the IP addresses, e.g., in an access point in the system changes, when the access terminal's Internet Attachment Point is changed. In some embodiments, the access terminal 1000 is unaware of the IP address corresponding to its IAP and/or unaware of network based changes in IAP, e.g., the access terminal 1000 uses the same predefined airlink address to communicate with its currently assigned IAP, whichever physical device in the system that may correspond to.

Received packet including information from network device 1050 includes a packet header source field 1052 and information to be communicated to the AT 1054. In some embodiments the received packet 1050 is a MAC packet. The packet header source field 1052 includes a predetermined airlink address corresponding to a network device 1056, e.g., one of the set of predefined airlink addresses (predefined airlink address 1 1044, . . . , predefined airlink address n 1048).

The packet generation module 1022 generates packets including information to be communicated to a network device and a predetermined airlink address corresponding to the network device, said network device having an IP address which is longer than the predetermined airlink address. Generated packet directed to network device 1034 is an exemplary packet generated by packet generation module 1022. In some embodiments, the generated packets are MAC packets.

Address determination module 1024 selects the predetermined airlink address corresponding to the network device to which the access terminal seeks to communicate information from the set of stored predefined airlink addresses included in information 1040 and supplies the selected address to the packet generation module 1022. For example, if the AT desires to communicate information to the AT's IAP, the address determination module selects predefined airlink address 1 1044 and sends that selected address to packet generation module 1022, wherein the packet generation module includes the address in a generated packet, e.g., sets predetermined airlink address corresponding to network device 1036 to the predefined airlink address 1 1044 for generated packet 1034.

Device identification module 1026 determines from the set of predetermined airlink addresses (1044, . . . , 1048) and the predetermined airlink address included in a received packet, e.g., predetermined airlink address 1056 in received packet 1050, the network device which is the source of the information included in the received packet. For example, device identification module 1026 determines that the source of information 1054 in packet 1050 is the network device which is the AT's current IAP or is the network device which is the AT's current session controller.

Software module 1028 processes messages from network device 1, e.g., messages from the AT's IAP. Software module 1030 processes messages from network device n, e.g., messages from the AT's session controller.

Packet processing module 1032 processes a received packet in a manner that depends on which network device is determined to be the source of the information included in the received packet, said processing including directing the information to one of the software modules (1028, . . . , 1030) within the access terminal 1000 that processes messages received from the determined network device.

In various embodiments, nodes described herein are implemented using one or more modules to perform the steps corresponding to one or more methods of the aspect, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, the aspect is directed to a machine-readable medium including machine executable instructions for causing a machine, e.g., processor and associated hardware, to perform one or more of the steps of the above-described method(s).

In various embodiments nodes described herein are implemented using one or more modules to perform the steps corresponding to one or more methods, for example, signal processing, message generation and/or transmission steps. Some exemplary steps include transmitting a connection request, receiving a connection response, updating a set of information indicating an access point with which an access terminal has an active connection, forwarding a connection request, forwarding a connection response, determining resource assignment, requesting resources, updating resources, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as access terminals and/or access points, are configured to perform the steps of the methods described as being performed by the communications device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating an access point, the method comprising:
   receiving from an airlink, a first packet communicated from an access terminal, the first packet including information to be communicated to a network device and an airlink address corresponding to said network device, wherein said airlink address indicates a destination of the information, and wherein said network device has an IP address which is longer than said airlink address;
   determining at the access point the IP address corresponding to said airlink address from information mapping between airlink addresses and IP addresses;
   transmitting a second packet directed to said network device over a non-air link, said transmitted second packet including said determined IP address and the information to be communicated to said network device;
   wherein said step of determining the IP address corresponding to said airlink address is performed as a function of information identifying the access terminal from which the first packet was received, said information mapping airlink addresses to IP addresses including information mapping an airlink address to different IP addresses depending on a source of the packet which included the airlink address;
   wherein said network device is an Internet Attachment point; and
   wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

2. The method of claim 1, wherein said determining the IP address corresponding to said airlink address includes accessing a database including information mapping airlink addresses to IP addresses of network devices.

3. The method of claim 1, wherein said airlink address is an Internet Attachment Point address.

4. The method of claim 1, wherein said airlink address is a session controller address, said session controller being used to control communications sessions in which said access terminal is a participant.

5. The method of claim 2, wherein said airlink addresses are reserved addresses remaining the same when said network device for the access terminal changes, at least one of said airlink addresses in said database being as long as or shorter than any other address used by said access terminal over an airlink.

6. An apparatus comprising:
   a processor configured to:
   receive from an airlink, a first packet communicated from an access terminal, the first packet including information to be communicated to a network device and an airlink address corresponding to said network device, wherein said airlink address indicates a destination of the information, and wherein said network device has an IP address which is longer than said airlink address;
   determine the IP address corresponding to said airlink address from information mapping between airlink addresses and IP addresses;
   transmit a second packet directed to said network device over a non-air link, said transmitted second packet including said determined IP address and the information to be communicated to said network device;
   wherein the processor is configured to determine the IP address corresponding to said airlink address as a function of information identifying the access terminal from which the first packet was received, said information mapping airlink addresses to IP addresses including information mapping an airlink address to different IP addresses depending on a source of the packet which included the airlink address;
   wherein said network device is an Internet Attachment point; and
   wherein said Internet Attachment Point changes for said access terminal due to a change in access terminal location, the airlink address used by the access terminal to access the Internet Attachment Point remaining the same but a mapping between the airlink address an the IP address of the Internet Attachment Point changing when the access terminal changes Internet Attachment Points.

7. The apparatus of claim 6, wherein said processor is further configured to, in determining the IP address corresponding to said airlink address:
   access a database including information mapping airlink addresses to IP addresses of network devices.

8. The apparatus of claim 6, wherein said airlink address is an Internet Attachment Point address.

9. A non-transitory computer readable medium embodying machine executable instructions for operating an access point to implement a method for communicating with other communications devices, the method comprising:
   receiving from an airlink, a first packet communicated from an access terminal, the first packet including information to be communicated to a network device and an airlink address corresponding to said network device, wherein said airlink address indicates a destination of the information, and wherein said network device has an IP address which is longer than said airlink address;
   determining the IP address corresponding to said airlink address from information mapping between airlink addresses and IP addresses;

transmitting a second packet directed to said network device over a non-air link, said transmitted second packet including said determined IP address and the information to be communicated to said network device;

wherein said determining the IP address corresponding to said airlink address is performed as a function of information identifying the access terminal from which the first packet was received, said information mapping airlink addresses to IP addresses including information mapping an airlink address to different IP addresses depending on a source of the packet which included the airlink address;

wherein said network device is an Internet Attachment point; and wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

10. A method of operating an access point, the method comprising:

receiving from a communications link with a network device, a first packet including information to be communicated to an access terminal and a network device IP address indicating a source of the information, the communication link with the network device being a non-airlink;

determining an airlink address corresponding to said network device IP address from information mapping between airlink addresses and IP addresses, wherein said airlink address indicates the source of the information, and wherein said airlink address is shorter than said IP address;

transmitting over an airlink, a second packet to said access terminal, said transmitted second packet including said determined airlink address and the information to be communicated to said access terminal;

wherein said network device is an Internet Attachment point; and wherein sais Internet Attachment Point changes for said access terminal due to a change in access terminal location, the airlink address used by the access terminal to access the Internet Attachment Point remaining the same but a mapping between the airtink address and the IP address of the Internet Attachment Point changing when the access terminal changes Internet Attachment Points.

11. The method of claim 10, wherein said determining the IP address corresponding to said airlink address includes accessing stored information including information mapping IP addresses of network devices to airlink addresses.

12. The method of claim 11, wherein said stored information indicates a mapping of multiple network devices of the same type but having different IP addresses to the same airlink address.

13. The method of claim 12, wherein said airlink address is an Internet Attachment Point address.

14. The method of claim 12, wherein said airlink address is a session controller address.

15. The method of claim 12, wherein said airlink addresses are reserved addresses, at least one of said airlink addresses being as long as or shorter than any other address used by said access terminal over an airlink.

16. An apparatus comprising:
a processor configured to:
receive from a communications link with a network device, a first packet including information to be communicated to an access terminal and a network device IP address indicating the source of the information, the communication link with the network device being a non-airlink;

determine an airlink address corresponding to said network device address from information mapping between airlink addresses and IP addresses, wherein said airlink address indicates the source of the information, and wherein said airlink address is shorter than said IP address;

transmit over an airlink, a second packet to said access terminal, said transmitted second packet including said determined airlink address and the information to be communicated to said access terminal;

wherein said network device is an Internet Attachment point; and wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

17. The apparatus of claim 16, wherein said processor is further configured to, in determining the IP address corresponding to said airlink address, access stored information including information mapping IP addresses of network devices to airlink addresses.

18. The apparatus of claim 17, wherein said stored information indicates a mapping of multiple network devices of the same type but having different IP addresses to the same airlink address.

19. The apparatus of claim 18, wherein said airlink address is an Internet Attachment Point address.

20. A non-transitory computer readable medium embodying machine executable instructions for operating an access point to implement a method of communicating with other communications devices, the method comprising:

receiving from a communications link with a network device, a first packet including information to be communicated to an access terminal and a network device IP address indicating a source of the information, the communication link with the network device being a non-airlink;

determining an airlink address corresponding to said network device address from information mapping between airlink addresses and IP addresses, wherein said airlink address indicates the source of the information, and wherein said airlink address is shorter than said IP address;

transmitting over an airlink, a second packet to said access terminal, said transmitted second packet including said determined airlink address and the information to be communicated to said access terminal;

wherein said network device is an Internet Attachment point; and wherein said Internet Attachment Point changes for said access terminal due to a change in access terminal location, the airlink address used by the access terminal to access the Internet Attachment Point remaining the same but a mapping between the airlink address and the W address of the Internet Attachment Point changing when the access terminal changes Internet Attachment Points.

21. An access point, comprising:
a wireless receiver for receiving from an airlink, a first packet communicated from an access terminal, the first packet including information to be communicated to a network device and an airlink address corresponding to said network device, wherein said airlink address indicates a destination of the information, and wherein said network device has an IP address which is longer than said airlink address;
an IP address determination module for determining the IP address corresponding to said airlink address from information mapping between airlink addresses and IP addresses;
a network interface including a transmitter for transmitting a second packet directed to said network device over a non-air link, said transmitted second packet including said determined IP address and the information to be communicated to said network device;
wherein said IP address determination module is further configured to determine the IP address corresponding to said airlink address as a function of information identifying the access terminal from which the first packet was received, said information mapping airlink addresses to IP addresses including information mapping an airlink address to different IP addresses depending on the source of the packet which included the airlink address;
wherein said network device is an Internet Attachment point; and
wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

22. The access point of claim 21, further comprising:
a database coupled to said IP address determination module, said database including information mapping between airlink addresses and IP addresses of network devices.

23. The access point of claim 21, wherein said airlink address is an Internet Attachment Point address.

24. The access point of claim 21, wherein said airlink address is a session controller address, said session controller being used to control communications sessions in which said access terminal is a participant.

25. The access point of claim 21, wherein said airlink addresses are reserved addresses remaining the same when said network device for the access terminal changes, at least one of said airlink addresses in said database being as long as or shorter than any other address used by said access terminal over an airlink.

26. The access point of claim 21,
wherein said network interface further includes a receiver module for receiving from a communications link with the network device, a first packet including information to be communicated to the access terminal and the network device IP address indicating the source of the information; and
wherein the access point further includes:
an airlink address determination module for determining an airlink address corresponding to said network device address from said information mapping between airlink addresses and IP addresses, said airlink address being shorter than said IP address.

27. The access point of claim 26, further comprising:
an airlink packet generation module for generating packets to be transmitted over the airlink, said generated packets including said airlink address corresponding to said network device; and
a wireless transmitter module for transmitting said generated packets over the airlink to the access terminal.

28. The access point of claim 27, further comprising:
a database coupled to said airlink address determination module, said database including said information mapping between airlink addresses and IP addresses of network devices.

29. The access point of claim 21, wherein said database includes stored information mapping different IP addresses of multiple network devices to the same airlink address.

30. The access point of claim 29, wherein said airlink address is one of an Internet Attachment Point address and a session controller address.

31. An access point, comprising:
wireless receiver means for receiving from an airlink, a first packet communicated from an access terminal, the first packet including information to be communicated to a network device and an airlink address corresponding to said network device, wherein said airlink address indicates the source and destination of the information, and wherein said network device has an IP address which is longer than said airlink address;
means for determining the IP address corresponding to said airlink address from information mapping between airlink addresses and IP addresses;
network interface means, including means for transmitting a second packet directed to said network device over a non-airlink, said transmitted second packet including said determined IP address and the information to be communicated to said network device;
wherein said means for determining is further configured to determine the IP address corresponding to said airlink address as a function of information identifying the access terminal from which the first packet was received, said information mapping airlink addresses to IP addresses including information mapping an airlink address to different IP addresses depending on the source of the packet which included the airlink address;
wherein said network device is an Internet Attachment point; and
wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

32. A method of operating an access terminal to communicate information, the method comprising:
generating a packet at the access terminal, said packet including information to be communicated to a network device via an access point and an airlink address corresponding to said network device, wherein said airlink address indicates a destination of the information, wherein said network device has an IP address which is longer than said airlink address, and wherein said IP address is used for transmitting the packets over a non-airlink;
transmitting said generated packet over an airlink to the access point;
wherein said network device is an Internet Attachment point; and wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

33. The method of claim 32, wherein generating said packet includes selecting from a set of stored airlink addresses, the address corresponding to said network device to which the information is to be communicated.

34. The method of claim 33, wherein generating said packet includes putting said airlink address in a destination field of a packet header.

35. The method of claim 34, wherein said packet is a MAC packet.

36. The method of claim 33, wherein said airlink addresses are reserved addresses, at least one of said airlink addresses in said stored set being shorter than any other addresses used by said access terminal over an airlink.

37. The method of claim 33, wherein said network device is an Internet Attachment Point used by said access terminal to obtain access to the network.

38. The method of claim 33, wherein the airlink address used by said access terminal to said network device is the same as the airlink address used by other access terminals to communicate with other network devices, said generated packet including an access terminal identifier used by a receiving device in combination with said airlink address to determine the IP address of said network device to which the information in the packet is to be communicated.

39. The method of claim 38, wherein the network devices which are accessed by different access terminals using the same address are the same type of network devices.

40. The method of claim 35, wherein said network device is a session controller used to control communications sessions in which said access terminal is a participant.

41. An apparatus comprising:
a processor configured to:
generate a packet at an access terminal, said packet including information to be communicated to a network device via an access point and an airlink address corresponding to said network device, wherein said airlink address indicates a destination of the information, wherein said network device has an IP address which is longer than said airlink address, and wherein said IP address is used for transmitting the packets over a non-airlink;
transmit said generated packet over an airlink to the access point;
wherein said network device is an Internet Attachment point; and
wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

42. The apparatus of claim 41, wherein said processor is further configured to, in generating said packet, select from a set of stored airlink addresses, the address corresponding to said network device to which the information is to be communicated.

43. The apparatus of claim 42, wherein said processor is further configured to, in generating said packet, put said airlink address in a destination field of a packet header.

44. The apparatus of claim 43, wherein said packet is a MAC packet.

45. The apparatus of claim 44, wherein said network device is a session controller used to control communications sessions in which an access terminal including said processor is a participant.

46. A non-transitory computer readable medium embodying machine executable instructions for operating an access terminal to implement a method of communicating information, the method comprising:
generating a packet at an access terminal, said packet including information to be communicated to a network device via an access point and an airlink address corresponding to a network device, wherein said airlink address indicates a destination of the information, wherein said network device has an IP address which is longer than said airlink address, and wherein said IP address is used for transmitting the packets over a non-airlink;
transmitting said generated packet over an airlink to the access point;
wherein said network device is an Internet Attachment point; and
wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

47. A method of operating an access terminal, the method comprising:
receiving a packet at the access terminal, said packet including information communicated to said access terminal and an airlink address corresponding to a network device, wherein said airlink address indicates a source of the information, wherein said network device has an IP address which is longer than said airlink address, and wherein said IP address is used for transmitting the packets over a non-airlink;
determining from stored address information and said airlink address included in said received packet, the network device which is the source of the information included in said received packet;
wherein said network device is an Internet Attachment point; and
wherein said Internet Attachment Point changes for said access terminal due to a change in access terminal location, the airlink address used by access terminal to access the Internet Attachment Point remaining the same but a mapping between the airlink address and the IP address of the Internet Attachment Point changing when the access terminal changes Internet Attachment Points.

48. The method of claim 47, further comprising:
processing the received packet in a manner that depends on which network device is determined to be the source of the information included in said received packet, said processing including directing the information to a software module within the access terminal that processes messages received from the determined network device.

49. The method of claim 48,
wherein said received packet includes said airlink address in a source field of a packet header included in said received packet; and
wherein said packet is a MAC packet.

50. The method of claim 48, wherein said airlink address is a reserved addresses, said airlink addresses being as short or shorter than any other addresses used by said access terminal over an airlink.

51. The method of claim 48, wherein said network device is an Internet Attachment Point used by said access terminal to obtain access to the network.

52. The method of claim 48, wherein the airlink address used by said access terminal to communicate with the network device is the same as the airlink address used by other access terminals to communicate with other network devices.

53. The method of claim 52, wherein said network device and said other network devices are Internet Access Points.

54. The method of claim 49, wherein said network device is a session controller used to control communications sessions in which said access terminal is a participant.

55. An apparatus comprising:
a processor for use in an access terminal, said processor configured to:
receive a packet at the access terminal, said packet including information communicated to said access terminal and an airlink address corresponding to a network device, wherein said airlink address indicates a source of the information, wherein said network device has an IP address which is longer than said airlink address, wherein said IP address is used for transmitting the packet over a non-airlink;
determine from stored address information and said airlink address included in said received packet, the network device which is the source of the information included in said received packet;
wherein said network device is an Internet Attachment point; and
wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

56. The apparatus of claim 55, wherein said processor is further configured to:
process the received packet in a manner that depends on which network device is determined to be the source of the information included in said received packet, said processing including directing the information to a software module within the access terminal that processes messages received from the determined network device.

57. The apparatus of claim 56,
wherein said received packet includes said airlink address in a source field of a packet header included in said received packet; and
wherein said packet is a MAC packet.

58. The apparatus of claim 56, wherein said airlink address is a reserved addresses, said airlink addresses being as long as or shorter than any other addresses used by said access terminal over an airlink.

59. The apparatus of claim 56, wherein the airlink address used by said access terminal to communicate with the network device is the same as the airlink address used by other access terminals to communicate with other network devices.

60. A non-transitory computer readable medium embodying machine executable instructions for operating an access terminal to implement a method of communicating information, the method comprising:
receiving a packet at the access terminal, said packet including information communicated to said access terminal and an airlink address corresponding to a network device, wherein said airlink address indicates a source of the information, wherein said network device has an IP address which is longer than said airlink address, and wherein said IP address is used for transmitting the packets over a non-airlink;
determining from stored address information and said airlink address included in said received packet, the network device which is the source of the information included in said received packet;
wherein said network device is an Internet Attachment point; and
wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

61. An access terminal, comprising:
a packet generation module for generating packets at the access terminal, said packets including information to be communicated to a network device via an access point and an airlink address corresponding to said network device, wherein said airlink address indicates a destination of the information, wherein said network device has an IP address which is longer than said airlink address, and wherein said IP address is used for transmitting the packets over a non-airlink;
a wireless transmitter for transmitting said generated packets over an airlink to the access point;
wherein said network device is an Internet Attachment point; and
wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

62. The access terminal of claim 61, further comprising:
a set of stored airlink addresses corresponding to network devices to which information can be communicated, one of said network devices being said network device; and
an address determination module for selecting the airlink address corresponding to said network device from the set of stored airlink addresses and for supplying the selected address to said packet generation module.

63. The access terminal of claim 62, wherein said generated packets are MAC packets.

64. The access terminal of claim 62, wherein said airlink addresses are reserved addresses, at least one of said airlink addresses in said stored set being shorter than any other addresses used by said access terminal over an airlink.

65. The access terminal of claim 62, wherein the airlink address used by said access terminal to said network device is the same as the airlink address used by other access terminals to communicate with other network devices, said generated packet including an access terminal identifier used by a receiving device in combination with said airlink address to determine the IP address of said network device to which the information in the packet is to be communicated.

66. The access terminal of claim 65, wherein the other network devices are the same type of network device as said network device.

67. The access terminal of claim 61, further comprising:
a receiver module for receiving a packet, said received packet including a received airlink address corresponding to a communicating network device; and
a device identification module for determining from a set of stored airlink addresses and said airlink address included in said received packet, the network device which is the source of information included in said received packet.

68. The access terminal of claim 67, further comprising:
a plurality of software modules corresponding to different network devices, each of said plurality of software modules processing messages from network devices to which the software module corresponds; and
a packet processing module for processing the received packet in a manner that depends on which network device is determined to be the source of the information included in said received packet, said processing including directing the information to one of said software modules within the access terminal that processes messages received from the determined network device.

69. The access terminal of claim 68,
wherein said received packet includes said airlink address in a source field of a packet header included in said received packet; and
wherein said packet is a MAC packet.

70. An access terminal, comprising:
packet generation means for generating packets at the access terminal, said packets including information to be communicated to a network device via an access point and an airlink address corresponding to said network device, wherein said airlink address indicates a destination of the information, wherein said network device has an IP address which is longer than said airlink address, and wherein said IP address is used for transmitting the packets over a non-airlink;
means for transmitting said generated packets over an airlink to the access point;
wherein said network device is an Internet Attachment point; and
wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

71. A method of operating an access terminal to communicate information, the method comprising:
generating a packet at the access terminal, said packet including information to be communicated to a network device and an airlink address corresponding to said network device, wherein said airlink address indicates a destination of the information, and wherein said network device has an IP address which is longer than said airlink address;
transmitting said generated packet over an airlink to an access point, which is configured to transmit the generated packet to the network device;
wherein said network device is an Internet Attachment point; and
wherein said Internet Attachment Point changes for said access terminal due to a change in access terminal location, the airlink address used by the access terminal to access the Internet Attachment Point remaining the same but a mapping between the airlink address and the W address of the Internet Attachment Point changing when the access terminal changes Internet Attachment Points.

72. An access terminal, comprising:
a packet generation module for generating packets at the access terminal, said packets including information to be communicated to a network device and an airlink address corresponding to said network device, wherein said airlink address indicates a destination of the information, and wherein said network device has an IP address which is longer than said airlink address;
a wireless transmitter for transmitting said generated packets over an airlink to an access point, which is configured to transmit the generated packet to the network device;
wherein said network device is an Internet Attachment point; and
wherein said Internet Attachment Point changes for said access terminal due to a change in access terminal location, the airlink address used by the access terminal to access the Internet Attachment Point remaining the same but a mapping between the airlink address and the IP address of the Internet Attachment Point changing when the access terminal changes Internet Attachment Points.

* * * * *